US012206566B2

(12) United States Patent
Kumar et al.

(10) Patent No.: US 12,206,566 B2
(45) Date of Patent: Jan. 21, 2025

(54) PREDICTING NETWORK ISSUES BASED ON HISTORICAL DATA

(71) Applicant: Juniper Networks, Inc., Sunnyvale, CA (US)

(72) Inventors: Prashant Kumar, Cupertino, CA (US); Jisheng Wang, Palo Alto, CA (US); Gorakhanath Kathare, Bangalore (IN); Yogesh B G, Bengaluru (IN); Kaushik Adesh Agrawal, Chelmsford, MA (US); Jie C Jiang, San Jose, CA (US); Scott A. McCulley, Burlington, MA (US); Greg Schrock, Billerica, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/155,665

(22) Filed: Jan. 17, 2023

(65) Prior Publication Data

US 2023/0261930 A1 Aug. 17, 2023

Related U.S. Application Data

(60) Provisional application No. 63/267,139, filed on Jan. 25, 2022.

(30) Foreign Application Priority Data

Jan. 17, 2022 (IN) .............................. 202241002581

(51) Int. Cl.
*H04L 43/0817* (2022.01)
*H04L 41/0604* (2022.01)
(Continued)

(52) U.S. Cl.
CPC ...... *H04L 43/0817* (2013.01); *H04L 41/0627* (2013.01); *H04L 41/0631* (2013.01);
(Continued)

(58) Field of Classification Search
CPC .. H04L 41/0627; H04L 41/0886; H04L 41/16
See application file for complete search history.

(56) References Cited

U.S. PATENT DOCUMENTS 8,661,295 B1 2/2014 Khanna et al.
9,729,439 B2 8/2017 MeLampy et al.
(Continued)

FOREIGN PATENT DOCUMENTS

EP 3930271 A1 12/2021

OTHER PUBLICATIONS

U.S. Appl. No. 18/155,658, filed Jan. 17, 2023, naming inventors Kumar et al.

*Primary Examiner* — Dhairya A Patel
*Assistant Examiner* — Eui H Kim
(74) *Attorney, Agent, or Firm* — Shumaker & Sieffert, P.A.

(57) ABSTRACT

Techniques are described for monitoring application performance in a computer network. For example, a network management system (NMS) includes a memory storing path data received from a plurality of network devices, the path data reported by each network device of the plurality of network devices for one or more logical paths of a physical interface from the given network device over a wide area network (WAN). Additionally, the NMS may include processing circuitry in communication with the memory and configured to: determine, based on the path data, one or more application health assessments for one or more applications, wherein the one or more application health assessments are associated with one or more application time (Continued)

periods for a site, and in response to determining at least one failure state, output a notification including identification of a root cause of the at least one failure state.

18 Claims, 15 Drawing Sheets

(51) Int. Cl.
*H04L 41/0631* (2022.01)
*H04L 41/08* (2022.01)
*H04L 41/16* (2022.01)
*H04L 43/067* (2022.01)

(52) U.S. Cl.
CPC .......... *H04L 41/0886* (2013.01); *H04L 41/16* (2013.01); *H04L 43/067* (2013.01)

(56) References Cited

U.S. PATENT DOCUMENTS

| | | | |
|---|---|---|---|
| 9,729,682 B2 | 8/2017 | Kumar et al. | |
| 9,736,046 B1 | 8/2017 | Jain et al. | |
| 9,762,485 B2 | 9/2017 | Kaplan et al. | |
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,439,915 B2 | 10/2019 | O'Brien et al. | |
| 10,623,285 B1 | 4/2020 | Shevade et al. | |
| 10,756,983 B2 | 8/2020 | Ratkovic et al. | |
| 10,819,593 B1 | 10/2020 | Parthasarathy et al. | |
| 10,992,543 B1 | 4/2021 | Rachamadugu et al. | |
| 11,075,824 B2 | 7/2021 | McCulley et al. | |
| 11,165,863 B1 | 11/2021 | Timmons et al. | |
| 2018/0041419 A1* | 2/2018 | Burgio | H04L 12/46 |
| 2018/0091413 A1 | 3/2018 | Richards et al. | |
| 2019/0068474 A1 | 2/2019 | Vasseur et al. | |
| 2020/0059856 A1 | 2/2020 | Cui et al. | |
| 2020/0267047 A1 | 8/2020 | Safavi | |
| 2020/0351172 A1 | 11/2020 | Vasseur et al. | |
| 2020/0366589 A1 | 11/2020 | Kaplan et al. | |
| 2020/0366590 A1 | 11/2020 | Kaplan et al. | |
| 2020/0366598 A1 | 11/2020 | Kaplan et al. | |
| 2020/0366599 A1 | 11/2020 | Kaplan et al. | |
| 2020/0403890 A1 | 12/2020 | McCulley et al. | |
| 2020/0409831 A1* | 12/2020 | Balasubramanian | G06F 11/3688 |
| 2021/0176114 A1 | 6/2021 | Hsu et al. | |
| 2022/0066906 A1 | 3/2022 | Kumar et al. | |
| 2022/0231939 A1* | 7/2022 | Mermovic | H04L 41/5025 |
| 2023/0070701 A1 | 3/2023 | Wang et al. | |
| 2023/0128098 A1 | 4/2023 | Agrawal et al. | |
| 2023/0164029 A1* | 5/2023 | Mermoud | H04L 41/145 709/220 |

* cited by examiner

PREDICTING NETWORK ISSUES BASED ON HISTORICAL DATA

This application claims priority to Indian Provisional Patent Application No. 202241002581, filed on Jan. 17, 2022, and claims the benefit of U.S. Provisional Patent Application No. 63/267,139, filed on Jan. 25, 2022. The entire content of each of these applications is incorporated herein by reference.

TECHNICAL FIELD

This disclosure generally relates to computer networks and, more specifically, monitoring and/or managing application performance in computer networks.

BACKGROUND

A computer network is a collection of interconnected computing devices that can exchange data and share resources. Example computing devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

SUMMARY

In general, this disclosure describes techniques for monitoring application performance and managing application issues that may impact user experiences in a network.

A cloud-based network management system (NMS) receives one or more of application performance data, path data, and network device data from network devices. The application performance data indicates one or more of jitter, latency, loss, and application services. The path data is indicative of one or more aspects of application and/or network performance as monitored on each logical path between network devices over a network, which may be a wide area network (WAN), e.g., a broadband network, Long Term Evolution (LTE) network, or Multi-protocol Label Switching (MPLS) network. The network device data is indicative of network device, e.g., router or gateway, performance in the WAN. The NMS includes an application health Service Level Expectation (SLE) metric engine that determines one or more application health assessments based on the path data received from the network devices. Based on the application health assessments, the NMS may identify success or failure states associated with the application, identify a root cause of the one or more failure states, and/or automatically recommend or invoke one or more remedial actions to address the identified failure states.

A given network device may establish multiple logical paths (e.g., peer paths or tunnels) over a WAN with multiple other network devices on a single physical interface. Each of the network devices may include a software agent or other module configured to report path data collected at a logical path level to the NMS in the cloud and/or the path data may be retrieved from the network devices by the NMS via an application programming interface (API) or an open configuration protocol. The cloud-based NMS may store the path data received from the network devices over time and, thus, provide application performance history in the network, including on a per-site basis.

In examples where the network devices comprise session-based routers, a given session-based router may establish multiple peer paths over the WAN with multiple other session-based routers on a single physical interface. Each of the session-based routers may include a software agent imbedded in the session-based router configured to report the path data collected at a peer path level to the NMS in the cloud. In examples where the network devices comprise packet-based routers, a given packet-based router may establish multiple tunnels over the WAN with multiple other packet-based routers on a single physical interface. Each of the packet-based routers may collect data at a tunnel level, and the tunnel data may be retrieved by the NMS via an API or an open configuration protocol or the tunnel data may be reported to the NMS by a software agent or other module running on the packet-based router.

According to the disclosed techniques, the application health SLE metric engine is configured to monitor the health condition of the logical paths from the network devices over the WAN, and detect network failures and performance degradation that may impact user experiences. The application health SLE metric engine uses a measurement unit of an "application minute" to measure a health state (e.g., good vs. bad) for each user of each application each minute, which is multiplied by the number of active users passing traffic through each path during that time interval as a user impact measurement. The application health SLE metric engine may aggregate the path data received from the network devices over a selected period of time (e.g., today, last 7 days, etc.) and at a selected granularity-level (e.g., site-level, application-level, or network device-level), to compile the application minute measurement. The application health SLE metric engine may determine a success or failure state associated with one or more classifiers, and classify the determined failure states. Although described in terms of a "minute," generally any time period may be used, and the phrase "time period" may be substituted for "minute" throughout this description. There may be some advantages to using a minute as the time period, but different time periods may be used consistent with the techniques of this disclosure.

The techniques of the disclosure provide one or more technical advantages and practical applications. The techniques enable the cloud-based NMS to automatically monitor and quantify a health state of an application based on received path data from network devices over time. For example, the NMS may store the path data in a microservices cloud infrastructure with no scaling limits. As such, the stored path data may provide application performance history of the network devices, which may enable the application health SLE metric engine to identify application performance degradations and distinguish these from network failures, in a manner that may not be detectable from assessments based on a shorter "snapshot" of data, e.g., performed by the network devices themselves.

In addition, the NMS may provide user visibility into application health for the network by generating and outputting notifications including identification of a root cause of any identified failure states. For example, the NMS may generate data representative of a user interface for display on a user interface device, e.g., operated by a network administrator of the network. The user interface may present results of a root cause analysis including classifiers of the determined failure states along with a timeline of the failed application minutes for each of the classifiers over a selected period of time and at a selected granularity level (e.g., site-level or application-level). The NMS may further generate and output notifications, e.g., to the network administrator of the network, with recommendations to perform one or more remedial actions to address the determined failure states. In other examples, the NMS may instead automatically invoke the one or more remedial actions to address the determined failure states.

In some examples, a network management system (NMS) of an enterprise network includes a memory storing path data received from a plurality of network devices operating as network gateways for the enterprise network, the path data reported by each network device of the plurality of network devices for one or more logical paths of a physical interface from the given network device over a wide area network (WAN). Additionally, the NMS may include processing circuitry in communication with the memory and configured to: determine, based on the path data, one or more application health assessments for one or more applications, wherein the one or more application health assessments are associated with one or more application time periods for a site, and in response to determining at least one failure state, output a notification including identification of a root cause of the at least one failure state.

In some examples, a method includes determining, by processing circuitry of a network management system (NMS) of an enterprise network and based on path data, one or more application health assessments for one or more applications, wherein the one or more application health assessments are associated with one or more application time periods for a site, and wherein a memory of the NMS is configured to store the path data received from a plurality of network devices operating as network gateways for the enterprise network, the path data reported by each network device of the plurality of network devices for one or more logical paths of a physical interface from the given network device over a wide area network (WAN); and in response to determining at least one failure state, outputting, by the processing circuitry a notification including identification of a root cause of the at least one failure state.

In some examples, a non-transitory computer-readable medium includes instructions for causing one or more processors to: determine, based on path data, one or more application health assessments for one or more applications, wherein the one or more application health assessments are associated with one or more application time periods for a site, and wherein a memory of a network management system (NMS) is configured to store the path data received from a plurality of network devices operating as network gateways for an enterprise network, the path data reported by each network device of the plurality of network devices for one or more logical paths of a physical interface from the given network device over a wide area network (WAN); and in response to determining at least one failure state, outputting a notification including identification of a root cause of the at least one failure state.

In some examples, a network management system (NMS) of an enterprise network includes a memory storing historical application performance data of one or more applications, historical path data of one or more logical paths from each of a plurality of network devices over a wide area network (WAN), and historical network device data of the plurality of network devices. Additionally, the NMS includes processing circuitry in communication with the memory and configured to: identify pattern data from the historical application performance data, historical path data, and historical network device data that is indicative of one or more previous network issues, predict, based on the identified pattern data and current application performance data, current path data, and current network device data associated with a network site, one or more potential network issues, determine at least one configuration change for one or more network devices of the network site to remediate the potential network issues, and output a notification of the at least one configuration change.

In some examples, a method includes identifying, by processing circuitry of a network management system (NMS), pattern data from historical application performance data of one or more applications, historical path data of one or more logical paths from each of a plurality of network devices over a wide area network (WAN), and historical network device data of the plurality of network devices, wherein the path data is indicative of one or more previous network issues, wherein a memory of the NMS is configured to store the historical application performance data, the historical path data, and the historical network device data; predicting, by the processing circuitry based on the identified pattern data and current application performance data, current path data, and current network device data associated with a network site, one or more potential network issues; determining, by the processing circuitry, at least one configuration change for one or more network devices of the network site to remediate the potential network issues, and outputting, by the processing circuitry, a notification of the at least one configuration change.

In some examples, a non-transitory computer-readable medium includes instructions for causing one or more processors to: identify pattern data from historical application performance data of one or more applications, historical path data of one or more logical paths from each of a plurality of network devices over a wide area network (WAN), and historical network device data of the plurality of network devices, wherein the path data is indicative of one or more previous network issues, wherein a memory of a network management system (NMS) is configured to store the historical application performance data, the historical path data, and the historical network device data; predict based on the identified pattern data and current application performance data, current path data, and current network device data associated with a network site, one or more potential network issues; determine at least one configuration change for one or more network devices of the network site to remediate the potential network issues; and output a notification of the at least one configuration change.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

FIGS. 1A-1D are block diagrams illustrating example network systems 100 including a network management system (NMS) 130 configured to monitor network performance and manage network faults in an enterprise network based on one or more application health assessments, in accordance with one or more techniques of the disclosure.

Figure 1A:
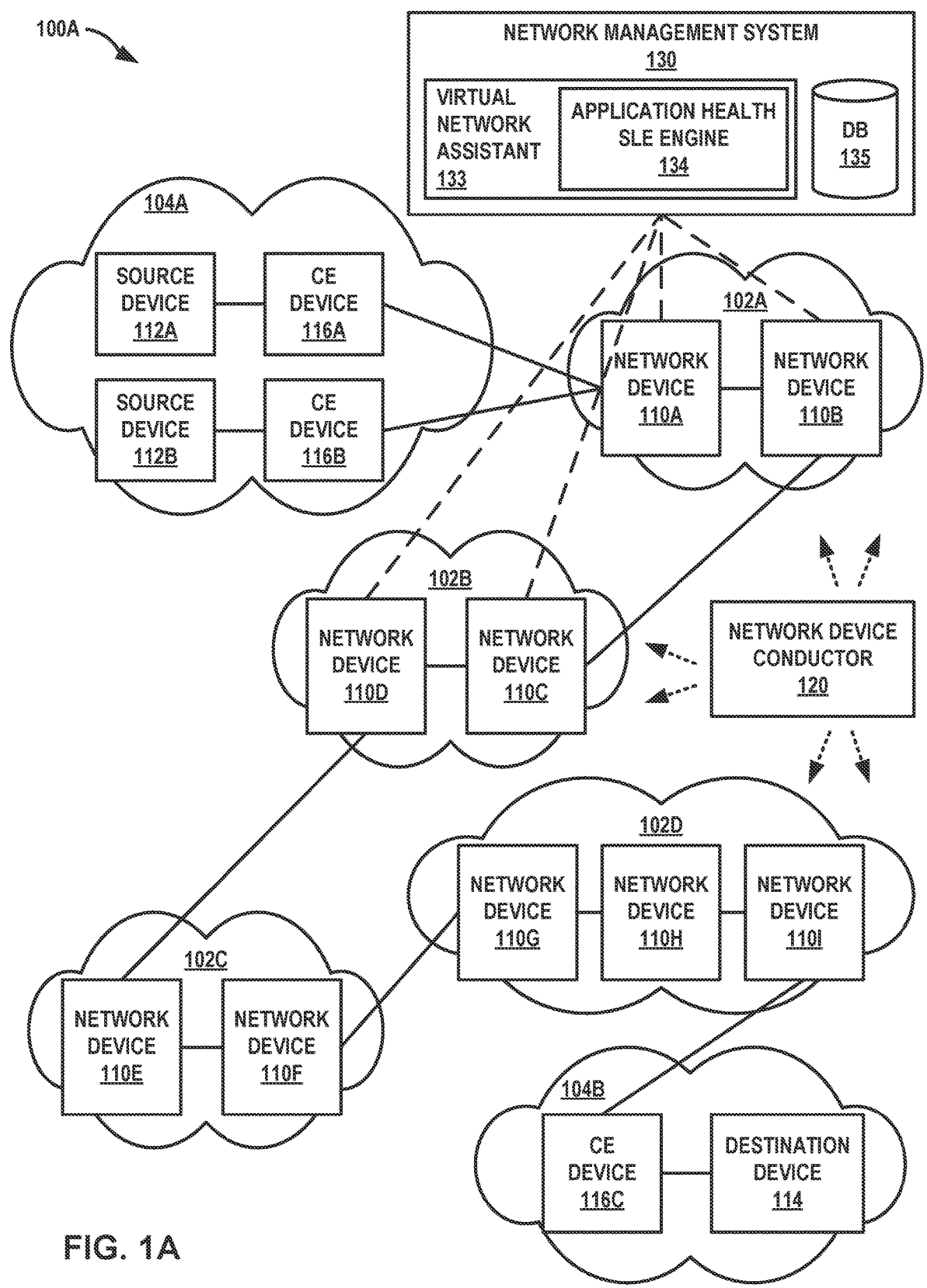
FIGS. 1A-1D are block diagrams illustrating example network systems including a network management system (NMS) configured to monitor network performance and manage network faults in an enterprise network based on one or more application health assessments, in accordance with one or more techniques of the disclosure.

FIG. 1A is a block diagram illustrating example network system 100A in accordance with the techniques of the disclosure. In the example of FIG. 1A, network system 100A includes networks 102A-102D (collectively, "networks 102") configured to provide Wide Area Network (WAN) connectivity to different customer networks 104A-104B ("customer networks 104") of an enterprise network. In some examples, networks 102 are service provider networks. Although in the example of FIG. 1A, network system 100A is illustrated as including multiple interconnected networks 102, in other examples network system 100A may alternatively include a single network that provides connectivity between customer networks 104.

Network devices 110A-110I (collectively, "network devices 110") of networks 102 provide source devices 112A and 112B (collectively, "source devices 112") and destination device 114 associated with customer networks 104 with access to networks 102 via customer edge devices 116A-116C (collectively, "CE devices 116"). Communication links between network devices 110 may be Ethernet, ATM, or any other suitable network connections.

Network device conductor 120 is a centralized management and policy engine that provides orchestration, administration, and zero-touch provisioning for distributed network devices 110 while maintaining a network-wide, multi-tenant service, and policy data model. Network device conductor 120 may be considered an orchestrator. In some examples, network device conductor 120 also provides monitoring and analytics for network devices 110, while in other examples monitoring and analytics for network devices 110 and/or CE devices 116 are provided by NMS 130 only. In some examples, NMS 130 provides WAN Assurance services to networks 102 and provides Wireless Assurance and/or Wired Assurance services to customer networks 104. In the example of FIG. 1A, NMS 130 includes a virtual network assistant 133 which may provide machine-learning based analytics of data collected by NMS 130 from network devices 110 of networks 102 for the WAN Assurance services, and may provide machine-learning based analytics of data collected by NMS 130 from CE devices 116 or other customer equipment within customer networks 104 for the Wireless Assurance and/or Wired Assurance services.

CE devices 116 and network devices 110 are discussed herein for purposes of example as being routers. However, techniques of the disclosure may be implemented using any network device, such as switches, routers, gateways, or other suitable network devices that may send and receive network traffic. Customer networks 104 may be networks for geographically separated sites of the enterprise network, for example. Each of customer networks 104 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices not depicted in FIG. 1A. The configuration of network system 100A illustrated in FIG. 1A is merely an example. For example, network system 100A may include any number of customer networks 104. Nonetheless, for ease of description, only customer networks 104A-104B are illustrated in FIG. 1A.

Networks 102 represent one or more publicly accessible computer networks that are owned and operated by one or more service providers. A service provider is usually a large telecommunications entity or corporation. Each of networks 102 is usually a large Layer-Three (L3) computer network, where reference to a layer followed by a number refers to a corresponding layer in the Open Systems Interconnection (OSI) model. Each network 102 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each network 102 may be coupled to one or more networks administered by other providers, and may thus form part of a large-scale public network infrastructure, e.g., the Internet. Consequently, customer networks 104 may be viewed as edge networks of the Internet. Each network 102 may provide computing devices within customer networks 104, such as source devices 112 and destination devices 114, with access to the Internet, and may allow the computing devices within customer networks 104 to communicate with each other.

Although additional network devices are not shown for ease of explanation, network system 100A may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 100A are illustrated as being directly coupled, one or more additional network elements may be included along any of the communication links between network devices 110, such that the network elements of computer network system 100A are not directly coupled.

Each network 102 typically provides a number of residential and business services for customer networks 104, including residential and business class data services (which are often referred to as "Internet services" in that these data services permit access to the collection of publicly accessible networks referred to as the Internet), residential and business class telephone and/or voice services, and residential and business class television services.

In some examples, network devices 110 comprise packet-based routers that employ a packet- or flow-based routing scheme to forward packets according to defined network paths established by a centralized controller, such as a Software-Defined Networking (SDN) controller, that performs path selection and traffic engineering. A given one of network devices 110, e.g., network device 110A, that comprises a packet-based router operating as a network gateway for customer network 104A may establish multiple tunnels, e.g., Internet Protocol security (IPsec) tunnels, over the WAN with one or more other packet-based routers, e.g., network device 110I, operating as network gateways for other sites of the enterprise network, e.g., customer network 104B. As described herein, each of the packet-based routers may collect data at a tunnel level, and the tunnel data may be retrieved by NMS 130 via an API or an open configuration protocol or the tunnel data may be reported to NMS 130 by a software agent or other module running on the packet-based router.

In other examples, network devices 110 comprise session-based routers that employ a stateful, session-based routing scheme that enables each network device 110 to independently perform path selection and traffic engineering. The use of session-based routing may enable network devices 110 to eschew the use of a centralized controller, such as an SDN controller, to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc. A given one of network devices 110, e.g., network device 110A, that comprises a session-based router operating as a network gateway for customer network 104A may establish multiple peer paths over the WAN with one or more other session-based routers, e.g., network device 110I, operating as network gateways for other sites of the enterprise network, e.g., customer network 104B. As described herein, each of the session-based routers may include a software agent imbedded in the session-based router configured to report path data collected at a peer path level to NMS 130.

A network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

When, e.g., network device 110A receives a packet for a flow originating from source device 112A and destined for destination device 114, network device 110A determines whether the packet belongs to a new session (e.g., is the "first" packet or "lead" packet of the session). In some examples, network device 110A determines whether a source address, source port, destination address, destination port, and protocol of the first packet matches an entry in a session table. If no such entry exists, network device 110A determines that the packet belongs to a new session and creates an entry in the session table. Furthermore, if the packet belongs to a new session, network device 110A generates a session identifier for the session. The session identifier may comprise, e.g., a source address and source port of source device 112A, a destination address and destination port of destination device 114, and a protocol used by the first packet. Network device 110A may use the session identifier to identify subsequent packets as belonging to the session.

In some examples, network devices 110 perform stateful routing for a session. This means that network devices 110 forward each packet of the forward packet flow of a session sequentially and along the same forward network path. As described herein, the "same" forward path means the same network devices 110 that form a segment or at least a portion between a device originating the packet and a device to which the packet is destined (and not necessarily the entire network path between the device originating the packet and the device to which the packet is destined). Further, network devices 110 forward each packet of the return flow of the session sequentially and along the same return network path. The forward network path for the forward packet flow and the return network path of the return flow may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1A, a stateful routing session may be established from ingress network device 110A through intermediate network devices 110B-110H to egress network device 110I. In this example, network device 110A determines that the first packet is an unmodified packet and the first packet of a new session. Network device 110A modifies the first packet to include metadata specifying the session identifier (e.g., the original source address, source port, destination address, and destination port). Network device 110A replaces the header of the modified first packet to specify a source address that is an address of network device 110A, a source port that is a port via which network device 110A forwards the modified first packet toward destination device 114, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with the session. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, if the source port and/or destination port for the session is 80, network device may determine that the session is associated with HTTP. In other examples, network device 110A may determine that one or more of a source address, source port, destination address, or destination port for the session belong to a block of address or ports indicative that a particular service is associated with the session.

In some examples, network device 110A uses the determined network service for the session to select a forward path for forwarding the first packet and each subsequent packet toward destination device 114. In this fashion, network device 110A may perform service-specific path selection to select a network path that best suits the requirements of the service. In contrast to a network topology that uses an SDN controller to perform path selection, each network device 110 performs path selection. Further, the use of session-based routing enables each network device 110 to make routing decisions at the service- or application-level, in contrast to conventional network devices that are only able to make routing decisions at the flow level.

Network device 110A forwards the modified first packet to network device 110B. Additionally, network device 110A stores the session identifier for the session such that, upon receiving subsequent packets for the session, network device 110A may identify subsequent packets as belonging to the same session and forward the subsequent packets along the same path as the first packet.

Intermediate network device 110B receives the modified first packet and determines whether the modified first packet includes a portion of metadata specifying the session identifier. In response to determining that the modified first packet includes metadata specifying the session identifier, intermediate network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table. If no such entry exists, network device 110B determines that the packet belongs to a new session and creates an entry in the session table. Furthermore, if the packet belongs to a new session, network device 110B generates a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this information is modified by each preceding network device 110 as each network device 110 forwards the first packet along the forward path. Furthermore, each network device 110 may store this header information to identify a previous network device 110 (or "waypoint") and a next network device 110 (or "waypoint") such that each network device 110 may reconstruct the same forward path and reverse path for each subsequent packet of the session.

Network device 110B replaces the header of the modified first packet to specify a source address that is an address of network device 110B, a source port that is a port via which network device 110B forwards the modified first packet toward destination device 114, a destination address that is an address of the next hop to which network device 110B forwards the first packet (e.g., an address of network device 110C), and a destination port that is a port of the next hop to which network device 110B forwards the first packet (e.g., a port of network device 110C). Network device 110B forwards the modified first packet to network device 110C. Additionally, network device 110B stores the session identifier for the session such that, upon receiving subsequent packets for the session, network device 110B may identify subsequent packets as belonging to the same session and forward the subsequent packets along the same path as the first packet.

Subsequent intermediate network devices 110C-110H process the modified first packet in a similar fashion as network devices 110A and 110B such that network devices 110 forward the subsequent packets of the session along the same path as the first packet. Further, each network device 110 stores a session identifier for the session, which may include an identification of the previous network device 110 along the network path. Thus, each network device 110 may use the session identifier to forward packets of the reverse packet flow for the session along the same network path back to source device 112A.

A network device 110 that may forward packets for a forward packet flow of the session to a destination for the packet flow is an egress, or "terminus" network device. In the foregoing example, network device 110I is a terminus network device because network device 110I may forward packets to CE device 116C for forwarding to destination device 114. Network device 110I receives the modified first packet that comprises the metadata specifying the session identifier (e.g., the original source address, source port, destination address, and destination port). Network device 110I identifies the modified first packet as destined for a service terminating at network device 110I by determining that the destination source address and destination source port specified in the metadata of the modified lead packet corresponds to a destination reachable by network device 110I (e.g., destination device 114 via CE device 116C). Network device 110I recovers the original first packet by removing the metadata from the modified first packet and modifying the header of the first packet to specify the original source address, source port, destination address, and destination port. Network device 110I forwards the recovered first packet to CE device 116C for forwarding to destination device 114.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; and U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, to implement session-based routing, each network device 110 maintains a local repository of service and topology state information for each other network device 110. The service and topology state information includes services reachable from each network device 110, as well as a network topology from each network device for reaching these services. Each network device 110 may transmit changes in the services reachable from the network device 110 and/or changes in the network topology for reaching the services from the network device to a central repository, e.g., a server. Further, each network device 110 may receive service and topology state information for each other network device 110 in computer network system 100A from the central repository.

In the foregoing example, network device 110A receives a packet, determines a session for a packet flow comprising the packet, determines a service associated with the session, and selects a network path for forwarding the packet. Network device 110A may use its local copy of the service and topology state information for each network device 110 to select the network path for forwarding the packet. For example, network device 110A may use the identified service associated with the packet and a network topology for reaching the identified service to select a network path that comports with a Service Level Agreement (SLA) requirement or other performance requirements for the service. Network device 110A may then forward the packet and subsequent packets for the flow along the selected path. In this fashion, network device 110A may perform service-specific path selection in that network device 110 may use criteria specific to the service associated with the packet to select a network path that best suits the requirements of the service.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

In accordance with the techniques of the disclosure, NMS 130 is configured to monitor application performance and manage application faults that may impact user experiences in an enterprise network (e.g., experiences of source devices 112 and/or destination device 114 in customer networks 104) based on application data and path data received from one or more network devices 110 operating as network gateways for the enterprise network. NMS 130 receives the path data from network devices 110 and stores the path data received over time in database 135. The path data is indicative of one or more aspects of network performance as monitored on each logical path (e.g., peer path or tunnel) between network devices 110 over the WAN, e.g., a broadband network, Long Term Evolution (LTE) network, or Multi-protocol Label Switching (MPLS) network. NMS 130 includes virtual network assistant 133 having application health Service Level Expectation (SLE) metric engine 134 that determines one or more application health assessments based on the path data received from network devices 110. Based on the application health assessments, NMS 130 may identify success or failure states associated with the application interface and/or path, identify a root cause of the one or more failure states, and/or automatically recommend or invoke one or more remedial actions to address the identified failure states.

In some examples, the application health Service Level Expectation (SLE) metric engine 134 is configured to determine, based on the path data, one or more application health assessments for one or more applications. In some examples, an application health assessment may represent an assessment of a quality of service provided by an application to a client. In some examples source devices 112 may represent one or more client devices and destination device 114 may represent an application server. In some examples source devices 112 may represent one or more application servers and destination device 114 may represent a client device. In any case, an application server may provide service to a customer device via a path formed by network devices 110. This means that path data indicated by network devices 110 may indicate a "health" of the application. The health of an application may represent a quality of service that a client receives from the application server at any given time over the path formed by network devices 110.

The term "path data" may be used herein to describe one or more kinds of data that indicate characteristics of a network connection between two or more nodes of the network. That is, path data may include data indicating a quality of a network connection (e.g., a path via network devices 110) over which a client device communicates with an application server. For example, path data may include latency values, jitter values, and loss values. Latency, jitter, and loss may indicate a quality of a network connection, because these parameters indicate a speed that packets traverse the path and a reliability by which packets traverse the path and arrive at the destination. For example, latency may represent an amount of time that it takes for packets to travel from one network node to another network node, or an amount of time that it takes a packet to make a round trip. Jitter may represent the variability of latency in a packet flow. Loss may represent a rate at which packets do not reach a destination, or are late to a destination. This means that application health SLE engine 134 may analyze latency, jitter, and loss to determine a health of one or more applications.

Path data may include one or more other kinds of data in addition to or alternatively to latency, jitter, and loss. For example, path data may include a first time to data packet value, data indicating one or more transmission control protocol (TCP) resets, data indicating one or more TCP retransmissions, data indicating an amount of bandwidth used by one or more applications, mean opinion score (MOS) data, low level transport layer metrics, or any combination thereof. Path data evaluated by application health SLE engine 134 may include any kind of data that corresponds to any portion of path between a client device and an application server. Application health SLE engine 134 may analyze the path data do determine a quality, or a health, of the path.

Network devices 110 may send path data to NMS 130. NMS 130 may store path data in database 135. In some examples, path data may correspond to a point in time or a period of time. That is, a quality of service provided by an application server to a client device may change (e.g., improve or worsen) over a period of time, and the change in quality may be reflected in the path data. For example, the latency across the path of network devices 110 may increase over a period of time, indicating that the quality of service provided via the path is worsening. Application health SLE engine 134 may monitor the quality of an application over time based on the path data.

In some examples, one or more application health assessments performed by application health SLE engine 134 are associated with one or more application time periods corresponding to an application. For example, an application time period may correspond to a period of time during which an application server provides service to a client device via the network path over network devices 110. In some examples, an application health assessment may include an evaluation one or more consecutive application time periods. For example, an application server may provide service over network devices 110 for a duration that includes a sequence of consecutive application time periods. application health SLE engine 134 may perform an application health assessment to determine the quality of service during each application time period of the sequence of consecutive application time periods. In some examples, each application time period of the sequence of application time periods comprises the same amount of time. An application time period may represent the quality of application service over a period of time. In some examples, an application time period may be referred to herein as an "application minute." Application time periods are not limited to indicating application health over one minute time periods. Application time periods may indicate a health of an application over any time period.

An application health assessment may, in some examples, include a classification of whether an application time period is "good" or "bad." Good application time periods may, in some examples, be referred to herein as high-quality application time periods. Bad application time periods may, in some examples, be referred to herein as low-quality application time periods. In some examples, an application health assessment may include more classifications than good or bad. For example, an application health assessment may, in some examples, include a classification of whether an application time period is good, fair, or bad. It may be beneficial for application health SLE engine 134 to determine a quality of each application time period in order to identify low-quality application time periods so that these time periods and identify a cause of poor network service.

Application health SLE engine 134 may, in some examples, apply one or more thresholds to classify each application time period of the one or more application time periods as a high-quality application time period or a low-quality application time period. In some examples, the one or more thresholds may include a threshold corresponding to each path data type of a set of path data types. For example, when path data includes latency, jitter, and loss, Application health SLE engine 134 may apply a latency threshold, a jitter threshold, and/or a loss threshold to classify an application time period as being high-quality or low-quality. Application health SLE engine 134 may, in some examples, apply one or more thresholds corresponding to path data types in addition to or alternatively to latency, jitter, and loss. In some examples, application health SLE engine 134 may determine the one or more thresholds based on the path data and historical application performance data. For example, application health SLE engine 134 may identify a latency threshold based on historical latency values corresponding to the application.

Application health SLE engine 134 may, in some cases, classify each low-quality (e.g., "bad) application time period based on an identified application-related problem classifier based on path data stored in database 135. In some examples, application-related problem classifiers may include information in addition to whether the application is good or bad. For example, application-related problem classifiers may include a slow application problem classifier corresponding to slow response time from an application server, a TCP retransmission problem classifier corresponding to one or more retries from a client device or the application server caused by service unavailability, an application bandwidth problem classifier corresponding to bandwidth being lower than a threshold amount of bandwidth required by an application corresponding to the respective application time period, or an application disconnect problem classifier corresponding to frequent disconnections from the client device or the application server. That is, application-related problem classifiers may indicate a cause or a source of bad application service. In some examples, Application health SLE engine 134 may apply one or more thresholds to classify each low-quality application time period based on an identified application-related problem classifier.

NMS 130 may, in some examples, execute a machine learning model based in order to classify each application time period of the one or more application time periods as a high-quality application time period or a low-quality application time period. In some examples, NMS 130 may execute a machine learning model in order to classify each low-quality (e.g., "bad) application time period with an application-related problem classifier. In some examples, NMS 130 may train one or more machine learning models based on path data that is stored in database 135.

NMS 130 may provide a cloud service that brings automated operations and service levels to the enterprise access layer for the WAN edge, and when used in conjunction with Wired and Wireless Assurance, transforms all operations covering the switches, IoT devices, access points, servers, printers, etc. Gateways provide rich streaming telemetry data that enable the insights for gateway health metrics and anomaly detection. After network devices 110 are onboarded into cloud-based NMS 130 (as described in more detail below), network devices 110 provide streaming telemetry data to cloud-based NMS 130.

In some examples, the telemetry data includes data relating to application response times and WAN link and gateway health measurements. For Gateway health, data can include, for example, CPU utilization, memory utilization, link utilization, temperature, fan, power. For WAN link health, data can include, for example, IPSec information, Routing Protocols information, and WAN interface information. Application experience information can include, for example, latency, jitter, packet loss, roundtrip times, and other metrics, on a per-application basis.

In some examples, NMS 130 is configured to identify pattern data from historical application performance data, historical path data, and historical network device data that is indicative of one or more previous network issues. In some examples, historical application performance data includes performance data corresponding to one or more applications. In some examples, historical path data includes performance data corresponding to a network path between two or more network devices. In some examples, historical network device data corresponds to performance data corresponding to one or more network devices (e.g., gateway devices.

NMS 130 may, in some examples, predict, based on identified pattern data and current application performance data, current path data, and current network device data associated with a network site, one or more potential network issues. For example, the historical application performance data, the historical path data, and the historical network device data may include one or more trends corresponding to healthy network performance and one or more trends corresponding to poor network performance. In some examples, the historical application performance data of one or more applications comprises one or more application health assessments associated with one or more application time periods for the network site. In some examples, NMS 130 may determine that one or more potential network issues are likely are likely to occur or are occurring based on the identified pattern data and current application performance data, current path data, and current network device data. NMS 130 may determine at least one configuration change for one or more network devices of a network site (e.g., network devices 110) to remediate the potential network issues.

NMS 130 may output a notification of the at least one configuration change. In some examples, the notification includes a recommendation to update configurations of one or more network devices of network devices 110 in accordance with the at least one configuration change. In some examples, the notification includes an instruction to update configurations of one or more network devices of network devices 110 in accordance with the at least one configuration change and the one or more network devices may implement the at least one configuration change. In some examples, NMS 130 may automatically update configurations of the one or more network devices of network devices 110 in accordance with the at least one configuration change. Outputting the notification of the at least one configuration change may, in some examples, comprise outputting the notification via a user interface for display on a user interface device of an administrator associated with system 100A.

In some examples, NMS 130 is configured to generate a machine learning model based on identified pattern data associated with a particular application deployed at the network site. NMS 130 may generate the machine learning model to reflect one or more patterns corresponding to good network performance and one or more patterns corresponding to poor network performance. NMS 130 may predict the potential network issues for the particular application deployed at the network site using the machine learning model. In some examples, the machine learning model that NMS 130 uses to determine the potential network issues is different from the machine learning model that NMS 130 may use to classify application time periods.

The machine learning model that NMS 130 uses to determine the potential network issues may, in some examples, include a self-learning model. NMS 130 may provide a continuous feedback mechanism of the determined at least one configuration change and subsequently collected application performance data, path data, and network device data. In other words, the machine learning model may accept as an input feedback data which indicates whether configuration changes suggested by the machine learning model resulted in an improvement in network performance.

In some examples, the at least one configuration change for the one or more network devices of network devices 110 comprises a service level agreement (SLA)-based routing threshold configuration. In some examples, the at least one configuration change for the one or more network devices of network devices 110 comprises a packet path configuration change. In some examples, the at least one configuration change for the one or more network devices of network devices 110 comprises one or more other kinds of configuration changes.

Figure 1B:
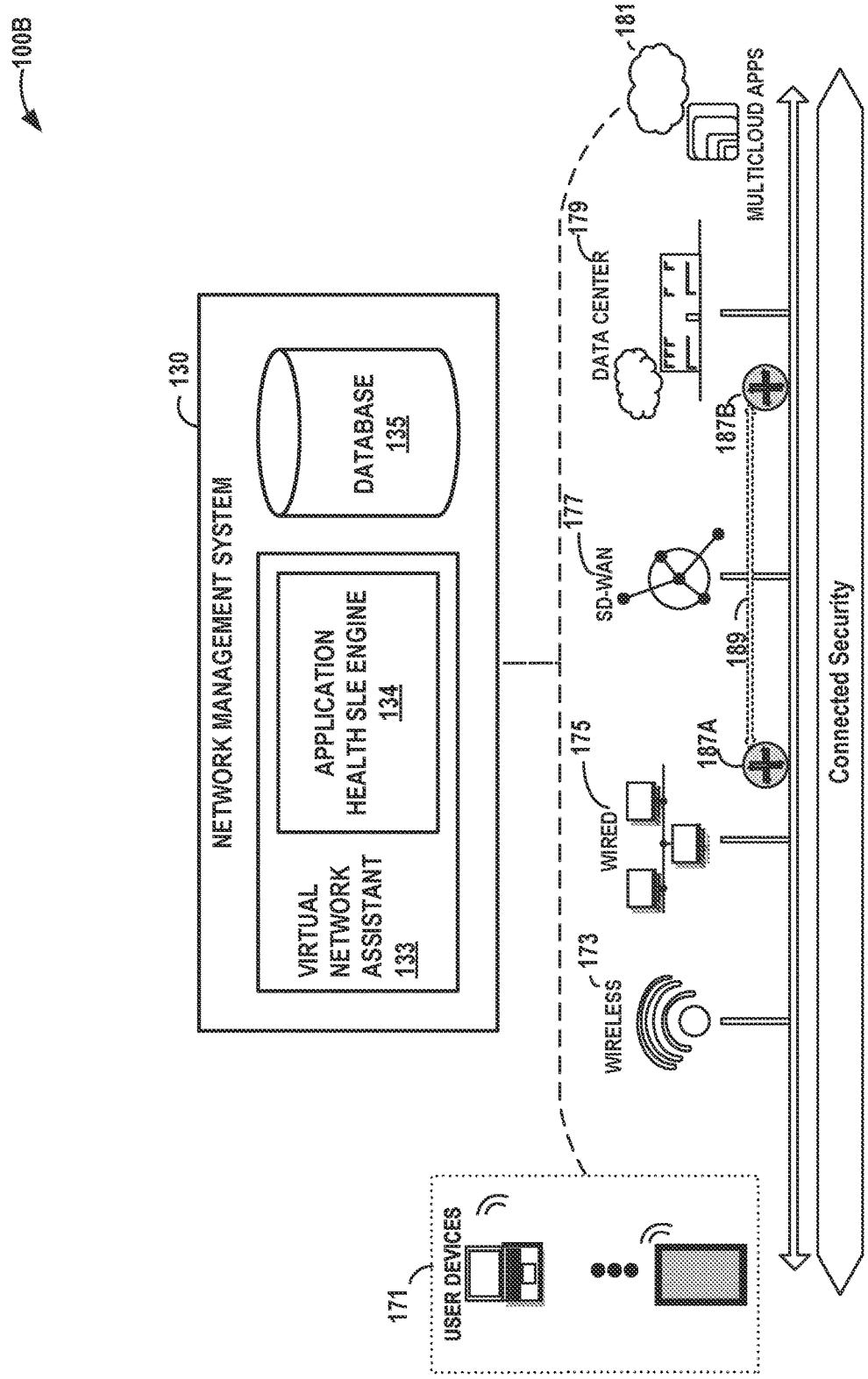

FIG. 1B is a block diagram illustrating further example details of network system 100B of FIG. 1A. In this example, FIG. 1B illustrates NMS 130 configured to operate according to an artificial intelligence/machine-learning-based computing platform providing comprehensive automation, insight, and assurance (e.g., Wireless Assurance, Wired Assurance and/or WAN Assurance) spanning from a wireless network 173 and wired LAN 175 at the network edge (far left of FIG. 1B) to cloud-based application services 181 hosted by computing resources within data centers 179 (far right of FIG. 1B). Referring back to FIG. 1A, user devices 171 may comprise one or more of source devices 112 and destination device 114, and wired LAN 175 hosting wireless network 173 may comprise one or more customer networks 104 of the enterprise network.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network system 100B so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 173 and wired LANs 175 to data centers 179 and application services 181. In general, SD-WAN 177 provides seamless, secure, traffic-engineered connectivity between "spoke" routers 187A of edge wired networks 175 hosting wireless networks 173, such as branch or campus networks (e.g., customer networks 104 from FIG. 1 as sites of an enterprise network), to "hub" routers 187B further up the cloud stack toward cloud-based application services 181. Referring back to FIG. 1A, routers 187A, 187B may comprise network devices 110 operating as network gateways for the enterprise network.

SD-WAN 177 often operates and manages an overlay network on an underlying physical Wide-Area Network (WAN), which provides connectivity to geographically separate customer networks, e.g., customer networks 104 of FIG. 1A. In other words, SD-WAN 177 may extend SDN capabilities and/or session-based routing or SVR capabilities to a WAN that allow networks to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 171 to steer traffic along selected paths, e.g., peer path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as SVR, provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100B, including enabling construction, presentation, and execution of intent-driven workflows for configuring and managing devices associated with wireless networks 173, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration.

By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, NMS 130 is configured to application performance and manage application faults that may impact user experiences in the enterprise network based on path data received from one or more network devices operating as network gateways for the enterprise network (e.g., routers 187A, 187B). NMS 130 receives the path data from routers 187A, 187B that is indicative of one or more aspects of application performance as monitored on each logical path 189, e.g., peer path or tunnel, between routers 187A, 187B in SD-WAN 177 over an underlying physical WAN, and stores the path data in database 135 over time.

NMS 130 includes virtual network assistant 133 having an application health SLE metric engine that may be configured to determine one or more application health assessments based on the path data in database 135. The application health SLE metric engine may aggregate the path data over a selected period of time and at a selected granularity-level (e.g., site-level or network device-level). The application health SLE metric engine may determine a success or failure state associated with one or more classifiers.

Application Health SLE may measure the real-time experience for the applications. Application health SLE may be different than the WAN link SLE. For example, a low-quality network connection may provide a quality user experience for non-real time applications like YouTube or file transfer protocol (FTP) applications, but low-quality user experiences for applications according to real-time protocols such as voice over internet protocol (VoIP) and web real-time communication (WebRTC).

In some examples, a measurement unit of Application Health SLE is a "session minute." For example, Wi-Fi Successful Connect SLE may measure client connection session, e.g., no matter if a pre-connection session (based on state machine logic) takes 5 seconds or 5 minutes, they are weighted equally. As comparison, Application Health SLE measures flow session minute thus each flow session has different weight based on its duration, e.g., if a zoom call session lasts 30 minutes, it's measured as 30 different session minutes, whereas a 1-minute HTTP session is only measured as 1 session minute.

TABLE 1

| SLE Category | SLE Name | Measurement Unit |
|---|---|---|
| Wi-Fi SLE | Successful Connect | Client (Connection) Session |
| | Time to Connect | Client (Connection) Session |
| | Roaming | Client (Roaming) Session |
| | Coverage | Client Minute |
| | Capacity | Client Minute |
| | Throughput | Client Minute |
| | AP Uptime | Device (AP) Minute |
| Wired SLE | Successful Connect | Client (Connection) Session |
| | Throughput | Interface Minute |
| | Switch Health | Device (Chassis) Minute |
| WAN SLE | WAN Link Health | Client Minute |
| | Gateway Health | Device (Gateway) Minute |
| | Application Health | Session (Flow) Minute |

Table 1 provides a mapping of one or more SLE names to measurement units. For example, the "time to connect" SLE name corresponds to the "client (connection session)" measurement unit and the "application health" SLE name corresponds to the "session (flow) minute" measurement unit.

Figure 1C:
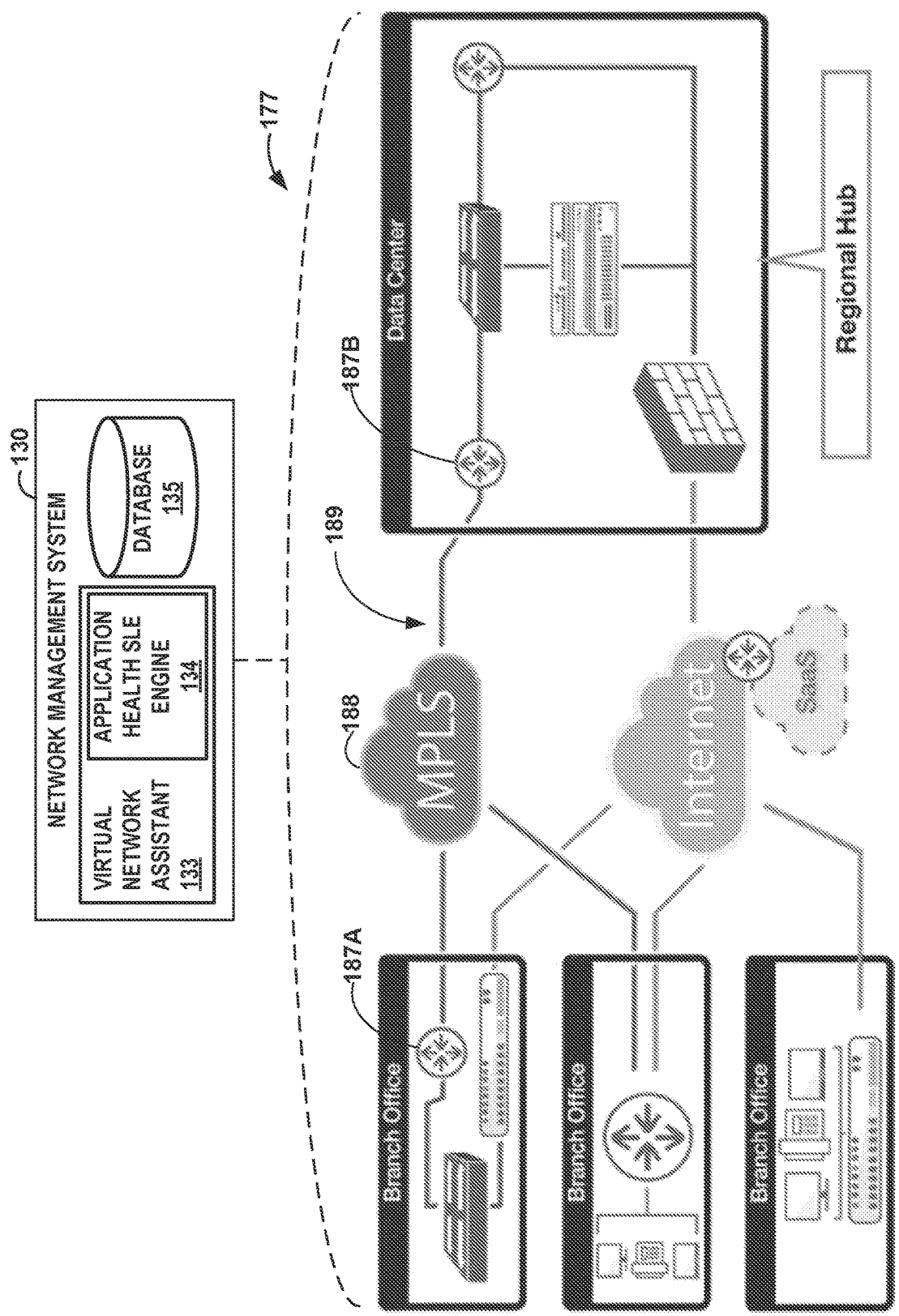

FIG. 1C is a block diagram illustrating further example details of a regional hub deployment model of network system 100B of FIG. 1B, in accordance with one or more techniques of this disclosure. In particular, FIG. 1C illustrates an example SD-WAN deployment architecture of SD-WAN 177 of FIG. 1B. In the illustrated example, SD-WAN 177 includes a spoke router 187A within a branch office connecting to a hub router 187B in a data center via logical path 189 over the underlying physical WAN, e.g., MPLS network 188. SD-WAN 177 also includes a hosted or Software as a Service (SaaS) applications.

When troubleshooting SD-WAN issues, it may be beneficial to separate the issues into three segments: 1) branch office, 2) logical path (e.g., peer path or tunnel) over WAN, e.g., MPLS, LTE or Broadband network, and 3) application services including both internally hosted applications (e.g., in the data center) and SaaS applications. NMS 130 may be configured to track the temporal connectivity topology of these three segments for each customer deployment and also detect various types of user-impacting issues in virtual network assistant 133. By joining the connectivity topology with the corresponding events happened in each segment, virtual network assistant 133 of NMS 130 may be able to pinpoint the location and root cause of different user-impacting SD-WAN issues. Examples of user-impacting issues for the branch office segment may include device health, bad cable, and configuration issues (e.g., maximum transmission unit (MTU)). Examples of user-impacting issues for the logical path segment may include link connectivity and link performance degradation. Examples of user-impacting issues for the application services segment may include service reachability and service performance.

In accordance with the techniques described in this disclosure, virtual network assistant 133 of NMS 130 has a WAN link health SLE metric engine configured to monitor the health condition of the logical paths from the spoke routers, e.g., logical path 189 from router 187A, and detect the network failures and performance degradation that may impact user experiences. The WAN link health SLE metric engine uses a measurement unit of a user-path-minute to measure a health state (e.g., success vs failure) for each user of each logical path each minute, which is multiplied by the number of active users passing traffic through each path during that time interval as a user impact measurement. The WAN link health SLE metric engine may aggregate path data received from network devices, e.g., routers 187A, 187B, over a selected period of time and at a selected granularity-level (e.g., site-level or network device-level). The WAN link health SLE metric engine may determine a success or failure state associated with one or more of service provider reachability, physical interface operation, or logical path performance based on the aggregated path data, and classify the determined failure states. Some examples of failure conditions, i.e., what conditions should be considered as failed user-path-minutes, are as follows: ISP unreachability, logical path down, logical path performance degradation, interface over-subscription, interface errors, and/or weak/unstable interface signal strength.

Several high-level design considerations are described herein. In some examples, the WAN link health SLE metric engine is configured to measure the health state for the logical path segment over WAN 188, which can be over broadband, LTE, or MPLS, between spoke router 187A in the branch office and hub router 187B in the data center, but may not measure the health state for the connection from the data center to the application servers or the health state for the application services themselves. In some examples, the WAN link health SLE metric engine is configured to measure the health state for the logical path segment from spoke routers, e.g., spoke router 187A in the branch office, but may not measure the health state for hub routers, e.g., hub router 187B in the data center.

The network devices may collect logical path statistics via bidirectional forwarding detection (BFD) probing, which is normally sent via a low-priority traffic class. As such, the logical path statistics may not always be representative of true user experiences at different application levels. For example, it is possible that a certain logical path may have low performance for a best effort traffic class and thus be determined as having bad or failed user-path-minutes, but the low performance for the best effort traffic class may not cause any true user impact since user application sessions are sent via a higher-priority traffic class. In some instances, this may result in a finding of "bad WAN Link Health SLE" but "good Application Health SLE." In addition, the network devices, e.g., session-based routers, may treat all available links (e.g., LTE, Broadband, or MPLS) as active and may monitor the logical path statistics over each link. As such, the WAN link health SLE metric engine may detect and report link failures even if there is no user traffic sent over a particular link during a failing interval.

In an SD-WAN regional hub deployment model, since branch office traffic can either go directly to Internet for SaaS applications or routed to data center for internal applications, it may be beneficial to configure probe destinations for branch office routers correspondingly to cover both internal and Internet applications.

Figure 1D:
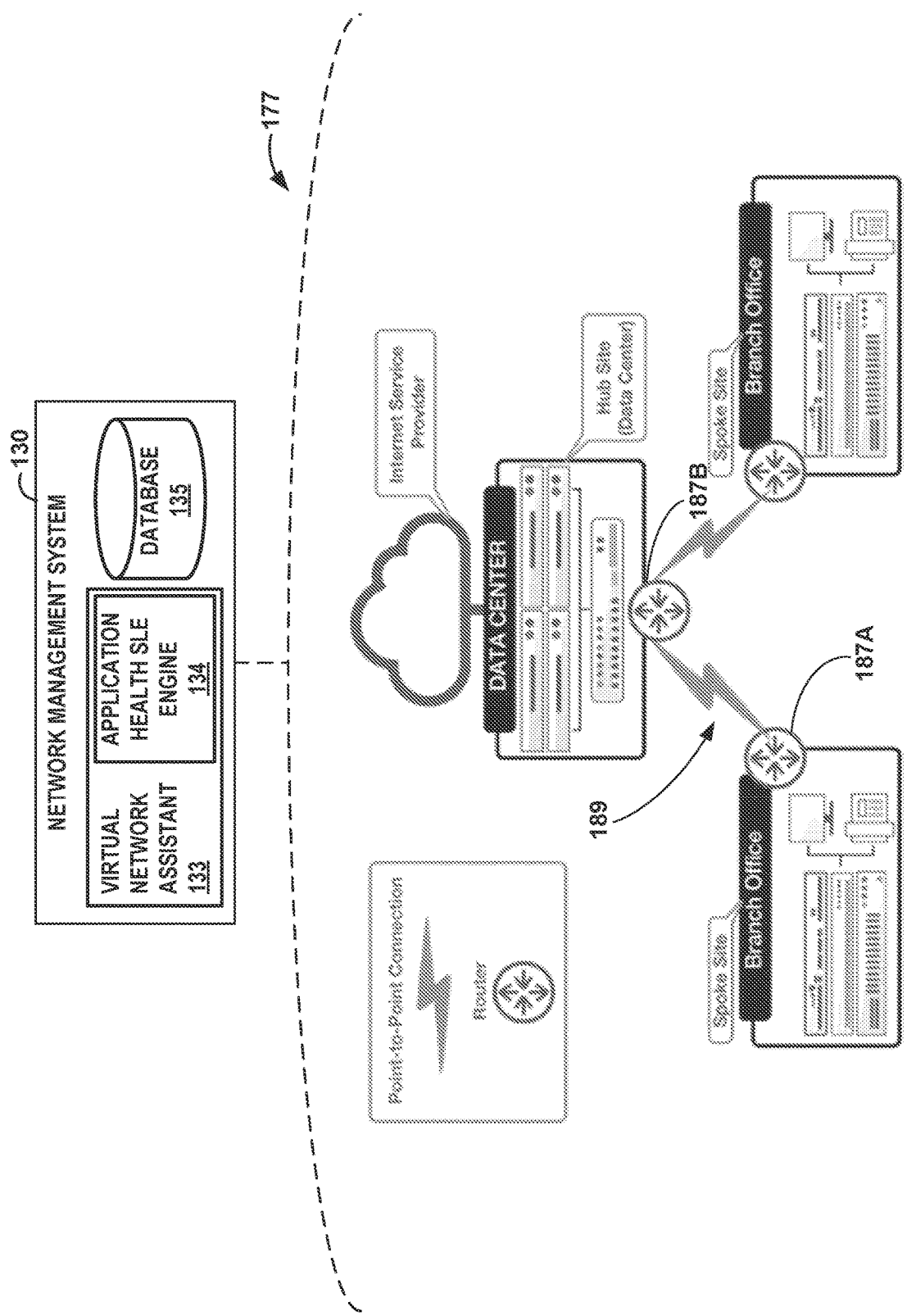

FIG. 1D is a block diagram illustrating further example details of a spoke hub deployment model of network system 100B of FIG. 1B, in accordance with one or more techniques of this disclosure. In particular, FIG. 1D illustrates an example SD-WAN deployment architecture of SD-WAN 177 of FIG. 1B. In the illustrated example, SD-WAN 177 includes a spoke router 187A within a branch office connecting to a hub router 187B in a data center via point-to-point connection 189 over the underlying physical WAN.

In some examples, for the spoke hub deployment model, all branch office traffic is routed to a data center before going to Internet. In some examples, the packet path from branch office to the data center, and to the Internet is divided into two segments analyzed separately. These segments may include a first segment from a branch office to the data center (e.g., between routers 187A and Router 187B), and a second segment between the data center and the Internet. In some examples, each spoke router may be configured to probe the hub router in the data center, while the hub router may be configured to probe different application services in the Internet. NMS 130 may, in some examples, analyze each of the first segment and the second segment in order to identify a root cause of one or more bad application time periods identified by application health SLE engine 134.

Figure 2:
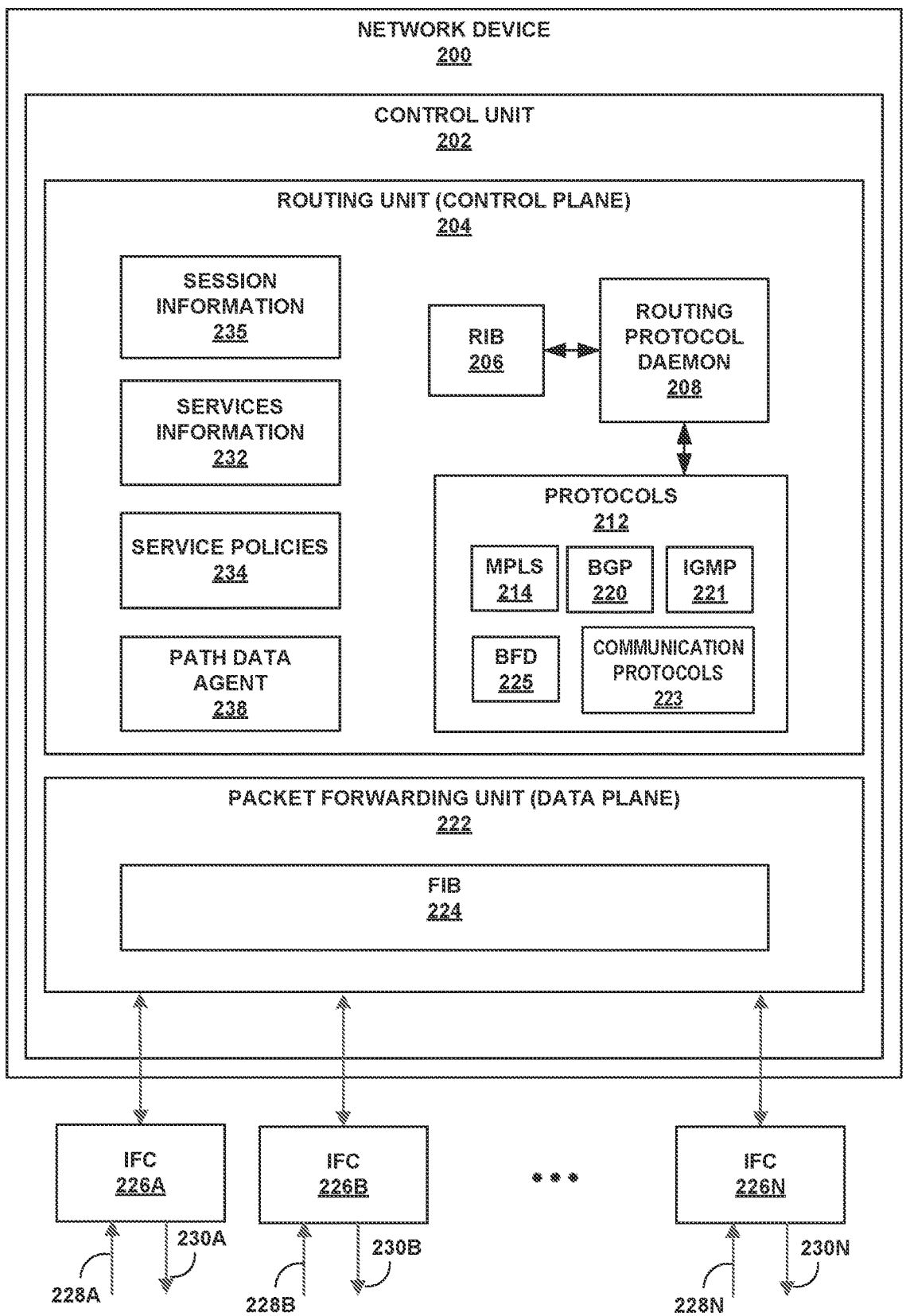
FIG. 2 is a block diagram illustrating an example network device in accordance with the techniques of the disclosure.

FIG. 2 is a block diagram illustrating an example network device 200 in accordance with the techniques of the disclosure. In general, network device 200 may be an example of one of network devices 110 of FIG. 1A or one of routers 187A, 187B of FIGS. 1B-1D. In this example, network device 200 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Network device 200 also includes a control unit 202 that determines routes of received packets and forwards the packets accordingly via IFCs 226.

Control unit 202 may comprise routing unit 204 and forwarding unit 222. Routing unit 204 operates as the control plane for network device 200 and includes an operating system that provides a multi-tasking operating environment for execution of a number of concurrent processes. Routing unit 204 communicates with other routers, e.g., such as network devices 110 of FIG. 1A, to establish and maintain a computer network, such as network system 100 of FIGS. 1A-1C, for transporting network traffic between one or more customer devices. Routing protocol daemon (RPD) 208 of routing unit 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols 223, such as TCP, UDP, TLS, or ICMP. Protocols 212 may also include one or more performance monitoring protocols, such as BFD 225.

RIB 206 may describe a topology of the computer network in which network device 200 resides, and may also include routes through the shared trees in the computer network. RIB 206 describes various routes within the computer network, and the appropriate next hops for each route, i.e., the neighboring routing devices along each of the routes. Routing unit 204 analyzes information stored in RIB 206 and generates forwarding information for forwarding unit 222, stored in forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing unit 204 receives a packet for a forward packet flow originating from a client device, e.g., source device 112A of FIG. 1, and destined for another client device, e.g., destination device 114 of FIG. 1, routing unit 204 determines whether the packet belongs to a new session (e.g., is the "first" packet or "lead" packet of a session). To determine whether the packet belongs to a new session, routing unit 204 determines whether session information 235 includes an entry corresponding to a source address, source port, destination address, destination port, and protocol of the first packet. If an entry exists, then the session is not a new session. If no entry exists, then the session is new and routing unit 204 generates a session identifier for the session and stores the session identifier in session information 235. Routing unit 204 may thereafter use the session identifier stored in session information 235 for the session to identify subsequent packets as belonging to the same session.

Services information 232 stores information that routing unit 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing unit 204 may query services information 232 with one or more of a source address, source port, destination address, destination port, or protocol of a session for a received packet to determine a service associated with a session. For example, routing unit 204 may determine a service identifier based on a correspondence of a source address, source port, destination address, destination port, or protocol in services information 232 to a source address, source port, destination address, destination port, or protocol specified by a session identifier. Routing unit 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing unit 204 applies, to the packet, the one or more service policies 234 that correspond to the service associated with the packet.

In some examples, network device 200 may comprise a session-based router that employs a stateful, session-based routing scheme that enables routing unit 204 to independently perform path selection and traffic engineering. The use of session-based routing may enable network device 200 to eschew the use of a centralized controller, such as an SDN controller, to perform path selection and traffic engineering, and eschew the use of tunnels. In some examples, network device 200 may implement session-based routing as Secure Vector Routing (SVR), provided by Juniper Networks, Inc. In the case where network device 200 comprises a session-based router operating as a network gateway for a site of an enterprise network, network device 200 may establish multiple peer paths over an underlying physical WAN with one or more other session-based routers operating as network gateways for other sites of the enterprise network.

Although primarily described herein as a session-based router, in other examples, network device 200 may comprise a packet-based router in which routing unit 204 employs a packet- or flow-based routing scheme to forward packets according to defined network paths, e.g., established by a centralized controller that performs path selection and traffic engineering. In the case where network device 200 comprises a packet-based router operating as a network gateway for a site of an enterprise network, network device 200 may establish multiple tunnels over an underlying physical WAN with one or more other packet-based routers operating as network gateways for other sites of the enterprise network.

In accordance with the techniques of the disclosure, the path data may include periodically-reported data and event-driven data. Control unit 202 of network device 200 is configured to collect logical path statistics via BFD 225 probing and data extracted from messages and/or counters at the logical path (e.g., peer path or tunnel) level. In some examples, control unit 202 is configured to collect statistics and/or sample other data according to a first periodic interval, e.g., every 3 seconds, every 5 seconds, etc. Control unit 202 may store the collected and sampled data as path data, e.g., in a buffer. In some examples, a path data agent 238 may periodically create a package of the statistical data according to a second periodic interval, e.g., every 3 minutes. The collected and sampled data periodically-reported in the package of statistical data may be referred to herein as "oc-stats." In some examples, the package of statistical data may also include details about clients connected to network device 200 and the associated client sessions. Path data agent 238 may then report the package of statistical data to NMS 130 in the cloud. In other examples, NMS 130 may request, retrieve, or otherwise receive the package of statistical data from network device 200 via an API, an open configuration protocol, or another of communication protocols 223. The package of statistical data created by path data agent 238 or another module of control unit 202 may include a header identifying network device 200 and the statistics and data samples for each of the logical paths from network device 200. In still other examples, the path data agent 238 reports event data to NMS 130 in the cloud in response to the occurrence of certain events at network device 200 as the events happen. The event-driven data may be referred to herein as "oc-events."

Figure 3:
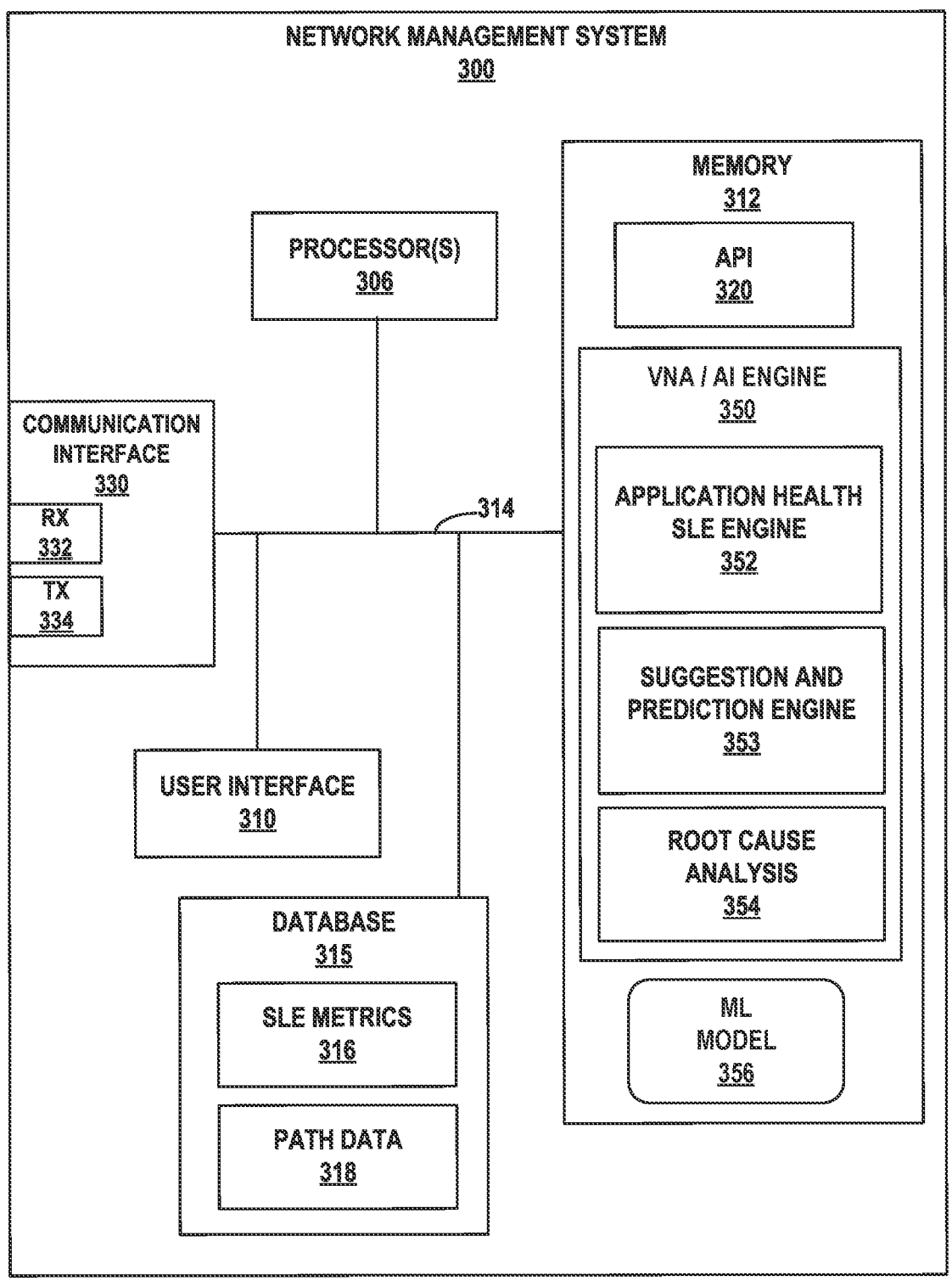
FIG. 3 shows an example NMS configured in accordance with one or more techniques of this disclosure.

FIG. 3 shows an example network management system (NMS) 300 configured in accordance with one or more techniques of this disclosure. NMS 300 may be used to implement, for example, NMS 130 in FIGS. 1A-1D. In such examples, NMS 300 is responsible for monitoring and management of one or more of network devices 110A-110I of FIG. 1A of networks 102, routers 187A, 187B of FIGS. 1B-1D, or network device 200 of FIG. 2.

In this example, NMS 300 receives path data collected by network devices 110A-110N. The path data may comprise periodically-reported statistics and data samples at a logical path (e.g., peer path or tunnel) level, such as telemetry data and data extracted from messages and/or counters. In some examples, the path data may also include details about clients connected to the network devices 110. In further examples, the path data may include event-driven data that is reported in response to the occurrence of certain events at network devices 110. NMS 300 uses the path data to calculate one or more SLE metrics in order to monitor the health condition of the logical paths from network devices 110 over an underlying physical WAN, and detect network failures and performance degradation that may impact user experiences. In some examples, NMS 300 may be a server as part of a micro-services cloud infrastructure within or accessible by network system 100 of FIGS. 1A-1C.

In some examples, in addition to monitoring network devices 110, NMS 300 is also responsible for monitoring and management of one or more wireless or wired networks (e.g., wireless network 173 and wired LAN 175 of FIG. 1B), in addition to monitoring network devices of service providers or other networks. In this example, NMS 300 also receives data collected by access points from user equipment (e.g., user devices 171 of FIG. 1B), such as data used to calculate one or more SLE metrics, and analyzes this data for cloud-based management of the wireless networks. In this manner, a single NMS 300 can be used for management of both network devices 110, which may include virtualized network devices (e.g., software-based routers executing on a virtual machine or container), and wireless networks, for an end-to-end WAN assurance system viewable via a single cloud-based WAN assurance portal.

NMS 300 includes a communications interface 330, one or more processor(s) 306, a user interface 310, a memory 312, and a database 318. The various elements are coupled together via a bus 314 over which the various elements may exchange data and information. Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 102 as shown in FIG. 1, and/or any wide area networks or local area networks. Communications interface 330 includes a receiver 332 and a transmitter 334 by which NMS 300 receives/transmits data and information to/from any of network devices 110 and/or any other devices or systems forming part of networks 102 or 104 such as shown in FIG. 1. The data and information received by NMS 300 may include, for example, SLE-related or event log data received from network devices 110 and used by NMS 300 to remotely monitor the performance of network devices 110 and networks 102. In some examples, NMS may further transmit data via communications interface 330 to any of network devices 110 to remotely manage networks 102.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 220, a virtual network assistant (VNA)/AI engine 350 including an application health SLE engine 352 and a root cause analysis engine 370, and an ML model 356. NMS 300 may also include any other programmed modules, software engines and/or interfaces configured for remote monitoring and management of network devices 110, including remote monitoring and management of any of network devices 110. NMS 300 may also include any other programmed modules, software engines and/or interfaces configured for remote monitoring and management of wireless networks, including remote monitoring and management of any of access points.

VNA/AI engine 350 analyzes path data 318 received from network devices 110 as well as its own data to identify when undesired or abnormal states are encountered in one of networks 102. For example, VNA/AI engine 350 may use root cause analysis module 354 to identify the root cause of any undesired or abnormal states. In some examples, root cause analysis module 354 utilizes artificial intelligence-based techniques to help identify the root cause of any poor SLE metric(s) at one or more of networks 102. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking API 320 to reboot one or more network devices 110. The corrective actions may further include restarting a switch and/or a router, invoking download of new software to a network device, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

VNA/AI engine 350 may, in some examples, construct, train, apply and retrain supervised and/or unsupervised ML model(s) 356 to event data (e.g., SLE metrics 316) to determine whether the collected network event data represents anomalous behavior that needs to be further analyzed by root cause analysis 354 of VNA/AI engine 350 to facilitate identification and resolution of faults. VNA/AI engine 350 may then apply the ML model 356 to data streams and/or logs of newly collected data (e.g., path data 318) of various network event types (e.g., connectivity events and/or statistics and data extracted from messages, counters, or the like) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model 356 to path data 318 indicates that mitigation is required, VNA/AI engine 350 may invoke root cause analytics 354 to identify a root cause of the anomalous system behavior and, if possible, trigger automated or semi-automated corrective action. In this way, VNA/AI engine 350 may construct and apply a ML model 356 based on a particular complex network to determine whether to perform further, resource-intensive analysis on incoming streams of path data collected (e.g., in real-time) from network devices within the complex network system.

In accordance with the techniques of this disclosure, application health SLE engine 352 determines one or more application health assessments for one or more applications.

For example, application health SLE engine 352 may analyze SLE-related data (e.g., path data 318) collected by network devices 110. For example, NMS 300 receives path data 318 from network devices 110 that is indicative of one or more aspects of network performance as monitored on each logical path, e.g., peer path or tunnel, between network devices 110 in an SD-WAN over an underlying physical WAN, and stores path data 318 in database 315 over time. Path data 318 may include periodically-reported data and event-driven data. For example, NMS 300 may receive path data 318 as a package of statistical data from each network device 110 on a periodic interval, e.g., every 3 minutes. The portion of path data 318 periodically reported in the package of statistical data may be referred to herein as "oc-stats." In some examples, the package of statistical data may also include details about clients connected to network devices 110 and the associated client sessions. The package of statistical data received from each network device 110 may include a header identifying the respective network device 110 and multiple statistics and data samples for each of the logical paths. In some examples, path data 318 may include event-driven data received from network devices 110 in response to the occurrence of certain events at network devices 110 as the events happen. The portion of path data 318 that includes event-driven data may be referred to herein as "oc-events." In some examples, NMS 300 may store path data 318 in a database having a micro-services cloud infrastructure with no scaling limits.

In some examples, path data 318 may include data indicating a quality of a network connection (e.g., a path via network devices 110) over which a client device communicates with an application server. For example, path data may include latency values, jitter values, and loss values. Latency, jitter, and loss may indicate a quality of a network connection, because these parameters indicate a speed that packets traverse the path and a reliability by which packets traverse the path and arrive at the destination. For example, latency may represent an amount of time that it takes for packets to travel from one network node to another network node, or an amount of time that it takes a packet to make a round trip. Jitter may represent the variability of latency in a packet flow. Loss may represent a rate at which packets do not reach a destination, or are late to a destination. This means that application health SLE engine 352 may analyze latency, jitter, and loss to determine a health of one or more applications.

Path data may include one or more other kinds of data in addition to or alternatively to latency, jitter, and loss. For example, path data may include a first time to data packet value, data indicating one or more TCP resets, data indicating one or more TCP retransmissions, data indicating an amount of bandwidth used by one or more applications, MOS data, low level transport layer metrics, or any combination thereof. Path data evaluated by application health SLE engine 352 may include any kind of data that corresponds to any portion of path between a client device and an application server. Application health SLE engine 352 may analyze the path data do determine a quality, or a health, of the path.

NMS 300 may execute application health SLE engine 352 to determine one or more application health assessments for one or more applications based on path data 318. In some examples, each application health assessment of the one or more application health assessments are associated with one or more application time periods. An application time period corresponds to the performance of an application over a time period.

Application Health SLE (e.g., WAN Assurance), WAN actions (e.g., Bad WAN Link, Bad Application Services), and conversational interface (e.g., troubleshoot gateway, troubleshoot application session) all target network issues causing application user experience problems, but have slight differences:

Application Health SLE may cover both persistent and intermittent WAN links which may be located in a spoke router, a hub router, or an application server. Application Health SLE engine 352 may, in some examples, detect network issues including jitter, latency, and loss. Impacted items may include interface, application, or user/client. WAN actions may include persistent WAN link network issues which cause bad application user experience, for example, application server slowness, spoke-hub tunnel slowness etc. Conversation interface may include both persistent and intermittent network issues across an end-to-end network, including wireless, LAN, WAN, and data center SaaS.

See U.S. patent application Ser. No. 17/554,928, filed Dec. 17, 2021, entitled NETWORK PERFORMANCE MONITORING AND FAULT MANAGEMENT BASED ON WIDE AREA NETWORK LINK HEALTH ASSESSMENTS, the entire contents of which are incorporated by reference herein.

Application health SLE engine 352 may, in some cases, identify one or more flow sessions that correspond to user experiences that need to be tracked, application health SLE engine 352 may determine based on a flow session, whether the flow session is "good" or "bad" in terms of end user experience. Furthermore, application health SLE engine 352 may determine, for each "bad" user experience flow session a root cause of the bad user experience. For example, Application health SLE engine 352 may identify which part of network is causing the bad user experience.

Application health SLE engine 352 may troubleshoot one or more bad user experience flow sessions by separating network issues from the application issues. For example, if a connection corresponding to an application (e.g., a VoIP application) is bad, application health SLE engine 352 may determine whether the problem is caused by a network link or is not caused by the network link. application health SLE engine 352 may identify an issue in the network that causes a bad flow. For example, application health SLE engine 352 may identify anode where an issue exists.

In some examples, suggestion and prediction engine 353 may provide one or more suggestions for addressing a network issue. For example, suggestion and prediction engine 353 may output a suggestion to increase bandwidth for a site based on identifying a trend of bad application performance. Suggestion and prediction engine 353 may predict one or more applications expected to have issues in the network in the future. One or more suggestions output by suggestion and prediction engine 353 may include configuration changes to overcome the application health issues such as changing a vector for a service, and changing a quality of service (QoS) for a service.

It may be beneficial for NMS 300 to identify one or more lists of top (e.g., most popular, most used) applications. This may help NMS 300 to predict when certain applications are likely to experience issues.

In some examples, suggestion and prediction engine 353 is configured to identify pattern data from the application performance data, historical path data, and historical network device data that is indicative of one or more previous network issues. Suggestion and prediction engine 353 may predict, based on the identified pattern data and current application performance data, current path data, and current network device data associated with a network site, one or more potential network issues.

In some examples, suggestion and prediction engine 353 may determine at least one configuration change for one or more network devices of the network site to remediate the potential network issues. In some examples, a suggested configuration change may represent a configuration change to one or more network devices e.g., (network devices 110 and/or routers 187). Suggestion and prediction engine 353 may output a notification of the at least one configuration change.

Since there are a variety of applications, it may be difficult for each individual customer to manually define and maintain a list of top-interest application list. It may be beneficial to dynamically learn and update a top-interest applications list for each customer each site periodically based on historical telemetry data. Popularity and application category are two factors for determining a top-interest application list.

Popularity may be determined based on flow count and flow duration. For example, the below text may indicate the top ten applications based on one day worth of data, ranked only by flow count. In some examples, the top ten applications comprise a majority (e.g., 85%) of a total number of flow sessions. In some examples, one or more flow sessions correspond to short-lived infrastructure flows such as domain name system (DNS) flows, internet control message protocol (ICMP) flows, and network time protocol (NTP) flows, which may not be sensitive to actual user experiences. As seen below, BitTorrent may be second on the top ten applications list due to the P2P protocol generating a high volume of short-lived connection attempt flows.

| normalized_app | flow_count_perc | avg_duration (minutes) |
|---|---|---|
| DNS | 49.0 | 1 |
| BITTORRENT | 10.21 | 2 |
| ICMP-ECHO | 6.92 | 1 |
| SSL | 5.45 | 408 |
| icmp | 4.24 | 1 |
| AMAZON | 4.16 | 119 |
| HTTP | 1.36 | 64 |
| GOOGLE-GEN | 1.2 | 50 |
| NTP | 1.12 | 1 |
| MQTT | 0.83 | 4 |

The below text may indicate the top ten applications based on one day worth of data, ranked only by flow duration (e.g., flow minutes). The below list may include long-lived flows such as secure sockets layer (SSL) flows and secure shell protocol (SSH) flows, which may be relevant for user experiences but lack user-sensitive applications.

| normalized_app | flow_minute_perc | flow_count_perc | avg_duration (minutes) |
|---|---|---|---|
| SSL | 30.65 | 5.45 | 408 |
| SSH | 13.06 | 0.61 | 1566 |
| IKE | 8.97 | 0.06 | 10295 |
| AMAZON | 6.87 | 4.16 | 119 |
| APPLE-PUSH | 6.19 | 0.26 | 1725 |
| IPP-OSPFIGP | 6.07 | 0.02 | 24848 |
| ospf | 4.06 | 0.01 | 27411 |
| UNSPECIFIED-ENCRYPTED | 2.44 | 0.19 | 951 |

-continued

| normalized_app | flow_minute_perc | flow_count_perc | avg_duration (minutes) |
|---|---|---|---|
| GCM | 2.23 | 0.21 | 759 |
| pim | 1.99 | 0.0 | 34832 |

The below text includes a list of top ten applications ranked by application category (e.g., gaming, multimedia, messaging) and flow duration (e.g., flows longer than one minute). This list includes one or more long-lived flow applications that are sensitive to user experience. In some examples, the below list includes these applications that account for a relatively small percentage (e.g., 3%) of a total number of flow sessions.

| normalized_app | flow_minute_perc | flow_count_perc | avg_duration (minutes) |
|---|---|---|---|
| JABBER | 1.81 | 0.03 | 5095 |
| MS-TEAMS | 0.51 | 0.34 | 110 |
| LYNC | 0.23 | 0.01 | 3218 |
| SPOTIFY | 0.2 | 0.1 | 149 |
| UBISOFT | 0.12 | 0.0 | 2446 |
| DLNA-STREAM | 0.11 | 0.01 | 645 |
| FACEBOOK-MESSENGER | 0.08 | 0.04 | 130 |
| BATTLENET | 0.08 | 0.01 | 668 |
| STEAM-STORE | 0.07 | 0.01 | 388 |
| ZOOM | 0.06 | 0.06 | 74 |

Top-interest applications may be dynamically updated at a per-level site based on historical usage patterns. In some examples, Top-interest applications may be selected based on popularity and application category. Popularity may, in some cases, be determined based on flow count and/or flow duration. The top ten applications selected based on popularity and category may, in some cases, dramatically reduce a load and cost of application health, and WAN health, and gateway health.

In some examples, flow session may be the highest-volume telemetry data source from SD-WAN, and not every flow session may be sent to the cloud for high-end devices deployed at the core or at data centers. Since only the top-interest application sessions may be consumed in SLE and Marvis, it may be more preferable to filter irrelevant flows at an early stage of the telemetry pipeline in order to save resources for both devices and in the cloud. In some examples, flow events may be collected because of a capability of sending update events for long-lived sessions.

In some examples one or more network devices may support on-device customized flow filtering logic. Network devices may filter down flow sessions directly inside the router, so that the router may save the resources in both the device and also in the cloud. This is a more preferable and also scalable solution.

In some examples, one or more network devices might not provide per-session level performance metrics mean opinion score (MOS). In some examples, a determination may be done at per-application-level and not a per-session level. For example, if there are ten concurrent video calls corresponding to one same branch site and passing through one network device, these ten calls may be determined as all "good" or all "bad" without determining whether each individual call is good or bad.

Application health SLE engine, may, in some examples, track three different network performance metrics including jitter, latency and loss to determine the session quality. In some examples, one or more applications have requirements for good user experiences. For example, file transfer applications may be more tolerable to high jitter and high latency as compared with VoIP applications or gaming applications.

An application might not have vendor-specified network performance metrics. Rather than asking customers to manually specify a threshold for each application (like what we are doing in Wi-Fi SLEs), NMS 300 may dynamically learn the network performance thresholds for each application. Application performance requirements may be irrelevant to customers or geo-location. NMS 300 may learn these thresholds by combining customer data collected in an NMS universe. For each application, the system may analyze a distribution of network performance metrics collected from different customer sites, and use a statistical approach to determine global thresholds.

In some examples, thresholds for different network performance metrics including jitter, latency, and loss may be determined at a per-application level and may be shared across different customers. Thresholds may be determined based on a mix of application-vendor-specified requirements and dynamically-learnt thresholds from NMS customer data.

Based on determining that a flow session is associated with a bad user experience, VNA/AI engine 350 may use root cause analysis 354 to identify a root cause of the bad user experience. For example, VNA/AI engine 350 may identify a part of the network that has a performance issue. In some examples, WAN assurance identify WAN-side network issues, which may have one or more segments with one or more deployment models. It may be important to set the probe intelligently to cover different segments to pinpoint root cause.

In some examples, a per-site top-interest application learning workflow may take perform cloud-based learning and baselining work including learning a per-site top-interest application list for each site based on historical flow session data. In some examples, user-defines applications may determine a final list which is pulled down to and also flow event data filtering, querying with GraphDB to identify the role of each router (spoke, hub) in the deployment, and determine the probe destination IP dynamically based on device role, and other per-application attributes learnt from data: probe packet size, probe packet protocol.

In some examples, a per-application performance learning workflow may perform per-application network performance learning work used to determine a quality of each session minute in Application Health SLE. This is one global learning job across whole NMS Universe and the results are applied to all different sites.

In some examples, a graph correlation and ingestion workflow may process and correlate telemetry data collected from different devices (e.g., a client device, an access point (AP), a switch, a router, and third party application services) to build a temporal network topology for each flow session. The graph correlation and ingestion workflow may ingest all correlated data into ArangoDB in the batch mode.

In some examples, an application health topology represents an example topology for application health SLE engine 352. The application health topology may correlate flow analytics and real-time performance monitoring (RPM) stats in oc-stats-analytics in stream processing, and consumes the top-interest application list and per-application performance thresholds from previous offline jobs to determine a quality of each flow session minute. Results of the application health topology may be used by application SLE aggregation.

A network administrator may, in some examples, be interested in determining how one or more applications are performing in the network. In some examples, application performance may depend on underlying network conditions. In some cases, one or more applications may perform poorly even though underlying network conditions are high-quality. In some cases, one or more applications may perform well even though underlying network conditions are low-quality. It may be beneficial for a system to differentiate application related issues from the network issues in order to troubleshoot problems experienced by a user.

Application health SLE engine 352 may, in some examples, identify application related issues as being separate from underlying network issues. For example, application health SLE engine 352 may identify an "application minute" as a unit for measuring a performance of an application over a period of time (e.g., one minute). Application minutes are not limited to one minute periods of time. In some examples, an application minute may be referred to herein as an "application time period." An application time period may represent performance of an application over any period of time (e.g., 10 seconds, 30 seconds, one minute, five minutes, one hour, or any other period of time.

In one example, an application minute may be identified by four tuples including an IP address of a client device corresponding to the application minute, a name of the application (e.g., Teams, YouTube, Zoom, Spotify), a network path corresponding to the application minute (e.g., local breakout, peer path), and a traffic class corresponding to the application (e.g., low quality of service, medium quality of service, high quality of service).

Figure 4:
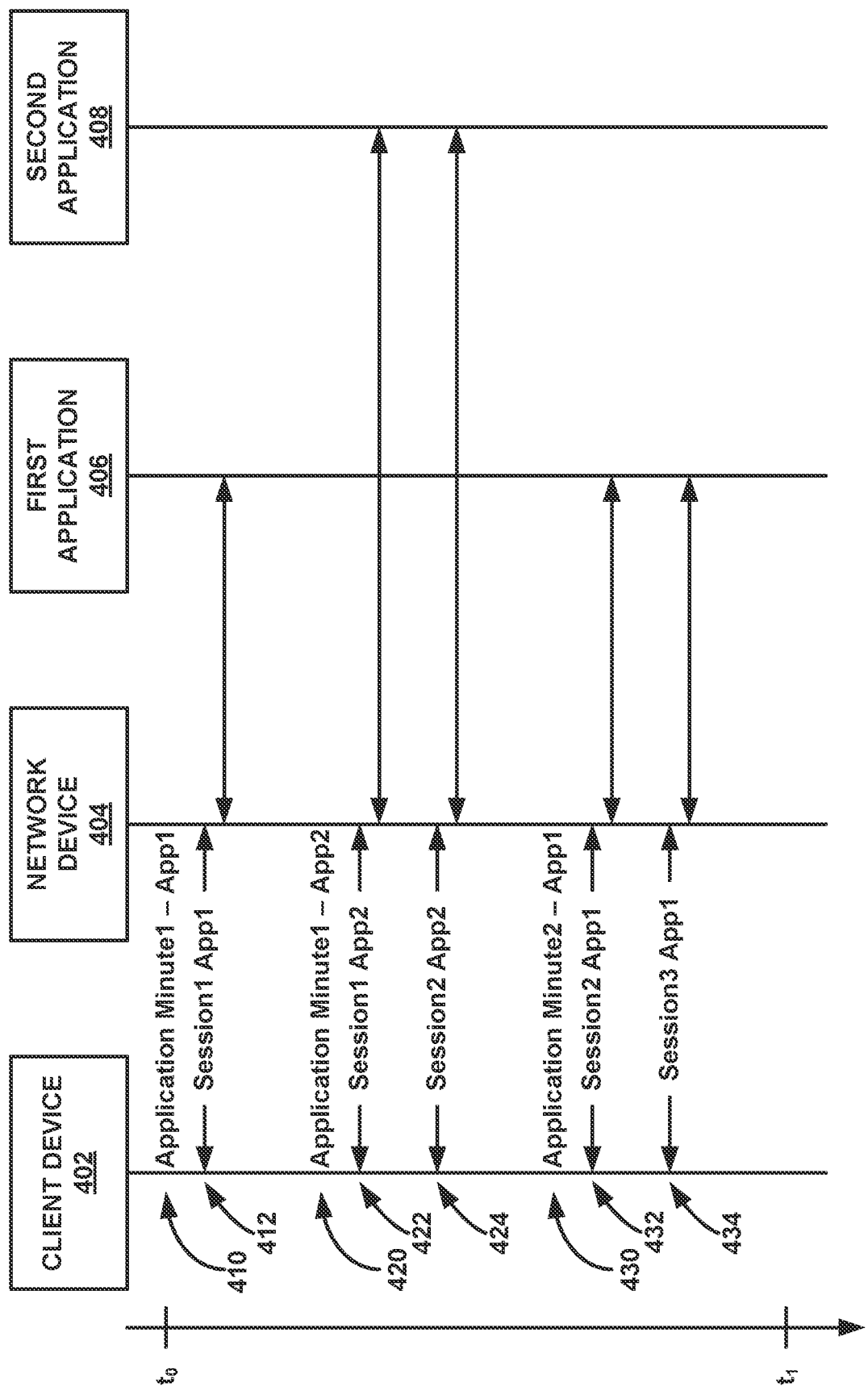
FIG. 4 is a conceptual diagram illustrating an example of multiple sessions for multiple applications for which application characteristics are measured in an application minute, in accordance with one or more techniques of this disclosure.

FIG. 4 is a conceptual diagram illustrating an example of multiple sessions for multiple applications for which application characteristics are measured in an application minute, in accordance with one or more techniques of this disclosure. For example, FIG. 4 includes a client device 402, a network device 404, a first application 406, and a second application 408.

In some examples, an application minute 410 may correspond to a link between client device 402 and first application 406 via network device 404. During the application minute 410, a first session 412 may exist between client device 402 and first application 406. In some examples, an application minute 420 may correspond to a link between client device 402 and second application 408 via network device 404. During the application minute 420, a first session 422 may exist between client device 402 and second application 408, and a second session 424 may exist between client device 402 and second application 408. In some examples, an application minute 430 may correspond to a link between client device 402 and first application 406 via network device 404. During the application minute 430, a second session 432 may exist between client device 402 and first application 406, and a third session 434 may exist between client device 402 and first application 406.

An application minute may represent user experience with respect to an amount of time a user spends on an application. As seen in FIG. 4, a single application minute can have one or more sessions of data flowing as part of the same application minute. For example, application minute 410 may correspond to a single session 412 and application minute 420 may correspond to two sessions 422 and 424. In some examples, a "session minute" or a "session flow minute" may represent an application minute in which only a single session is used.

Although described herein in terms of a "minute," an application minute may correspond to any time period, and the phrase "time period" may be substituted for "minute" throughout this description. There may be some advantages to using a minute as a time period for an application minute, but different time periods may be used consistent with the techniques of this disclosure.

User experience statistics may be collected for each session corresponding to each application, and aggregated into time-period-based "buckets" corresponding to an application minute. An application minute may be classified as "Good" or "Bad" based on collected data, and further classified into different classifier buckets for easy consumption.

Figure 5:
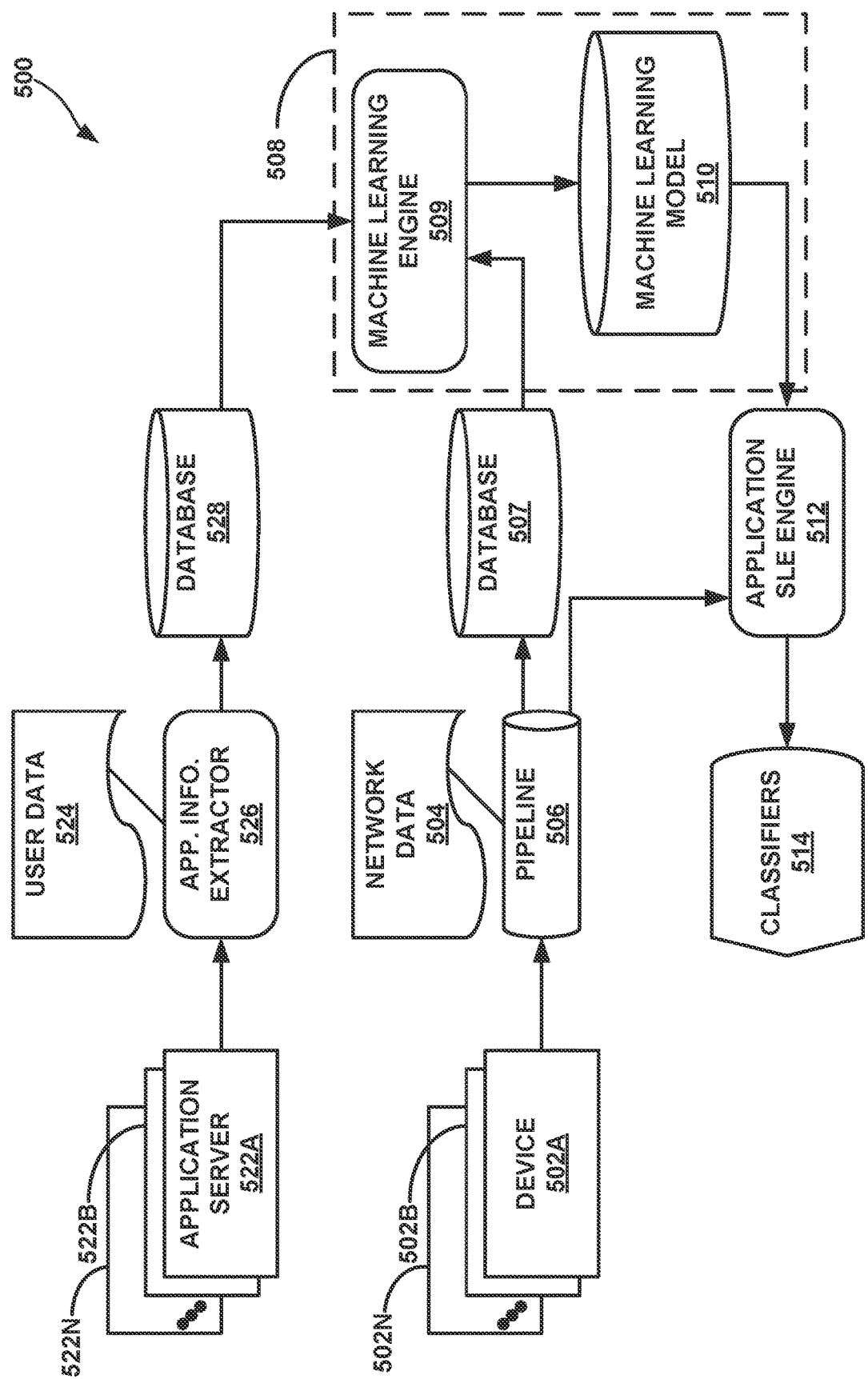
FIG. 5 is a block diagram illustrating a system for analyzing one or more application time periods, in accordance with one or more techniques of this disclosure.

FIG. 5 is a block diagram illustrating a system 500 for analyzing one or more application time periods, in accordance with one or more techniques of this disclosure. As seen in FIG. 5, system 500 includes devices 502A-502N (collectively, "devices 502"), pipeline 504, network data 506, database 507, machine learning system 508 including machine learning engine 509 and machine learning model 510, application SLE engine 512, and classifiers 514. Additionally, system 500 includes application servers 522A-522N (collectively, "application servers 522"), user data 524, application information extractor 526, and database 528.

In some examples, devices 502 may correspond to devices (e.g., network devices) within a WAN over which client device establishes a connection with an application server, and over which the application server provides service to the client device. In some examples, devices 502 may correspond to one or more network devices 110 of FIG. 10. That is, devices 502 may be part of a pathway within a WAN over which source devices 112A communicates with destination device 114. In some examples, source devices 112 of FIG. 1A are client devices and destination device 114 represents an application server. In some examples, source devices 112 of FIG. 1A represent application servers and destination device 114 may represent a client device. In some examples, devices 502 may correspond to routers 187 of FIGS. 1B-1D and/or any other devices within SD-WAN 177.

Network data 504 may include data that indicates a quality of a network connection (e.g., a WAN) over which a client device communicates with an application server. For example, network data 504 may include latency, jitter, and loss. Latency, jitter, and loss may indicate a quality of a network connection, because these parameters indicate how packets travel across the network connection. To ensure that an application server provides quality service to a client device, packets must traverse a network connection in an efficient manner. Latency, jitter, and loss may provide a picture as to the efficiency by which packets traverse a network connection. In some examples, latency, jitter, and loss are forwarding plane manager (FPM) values.

Forwarding plane manager (FPM) metrics may represent in band statistics used to determine the peer path status between two network devices. When session smart routers transfer session data, it may add extra information to determine peer router data. Additional details regarding forwarding plane manager are described in U.S. Pat. No. 11,075,824, filed 27 Jul. 2021, entitled IN-LINE PERFORMANCE MONITORING, the entire contents of which is incorporated herein by reference.

Details of obtaining application records using session information are described in U.S. patent application Ser. No. 17/452,344, filed 26 Oct. 2021, entitled APPLICATION RECORDS USING SESSION INFORMATION, the entire contents of which is incorporated herein by reference.

Latency represents an amount of time that it takes for a data packet to travel from point-to-point on a network. Latency may, in some examples, describe an amount of time it takes for a packet to travel between any two nodes within a network. In some examples, latency may describe an amount of time that it takes for a packet to make a round trip from a first device, to a second device, and back to the first device. In some examples, latency may describe an amount of time that it takes for a first packet to travel from a first device to a second device, and for a second packet to travel from the second device back to first device in response to the second device receiving the first packet. A latency value corresponding to an application minute may correspond to a median amount of time or a mean amount of time it takes for packets to travel between any two points in a network connection during the application minute. For example, during an application minute, a sequence of packets may travel between a first network device and a second network device. A latency corresponding to the application minute may represent an average amount of time or a mean amount of time that it takes for a packet of the sequence of packets to travel from the first network device to the second network device. In some examples, higher latency times may correspond to lower-quality service and lower latency times may correspond to higher-quality service.

Jitter may indicate an extent to which the amount of time that it takes packets to travel between two nodes in a network connection is inconsistent. For example, during an application minute, a sequence of packets may travel between a first network device and a second network device. Jitter corresponding to the application minute may indicate a level of variability in the amount of time that it takes for each packet of the sequence of packets to travel from the first network device to the second network device. In some examples, higher jitter may correspond to lower-quality service and lower jitter may correspond to higher-quality service.

Loss (also referred to herein as "packet loss") may correspond to a rate at which packets of a packet flow do not arrive at a destination, arrive at a destination out of order, or arrives at a destination too late. In some examples, high quality service may involve a steady packet stream where packets predictably arrive at a destination in order and on time. In some examples, low quality service may involve a "choppy" packet stream where packets are lost. Consequently, a higher rate of packet loss may correspond to lower quality service, and a lower rate of packet loss may correspond to higher quality service.

Pipeline 506 may deliver data to one or more engines for processing. For example, pipeline 506 may deliver network data 504 and/or other data to database 507. In some examples, database 507 may be stored in NMS 130. In some examples, database 507 is stored within database 135 of NMS 130. In some examples, database 507 is stored within NMS 130 separately from database 135. Pipeline 506 may represent any sort of connection (e.g., wired or wireless) that is configured to deliver data to database 507 or any other device. For example, FIG. 1A illustrates NMS 130 as including connections to each of network devices 110. These connections may be part of pipeline 506 which delivers network data 504 to a database of NMS 130 and/or other devices.

Machine learning system 508 may include machine learning engine 509 and machine learning model 510. In some examples, machine learning engine 509 may be configured to execute machine learning model 510 to generate one or more outputs based on input data. In some examples, the input data may represent data from one or more databases (e.g., database 507 and/or database 528). In some examples, machine learning model 510 may be stored by a network management system (e.g., NMS 130) and the network management system may execute machine learning model 510 using machine learning engine 509.

In some examples, machine learning engine 509 may execute machine learning model 510 in order to generate an output based on input data stored by database 507. In some examples, database 507 may include network data 504 corresponding to one or more application time periods. An application time period may represent a period of time in which a client device receives service from an application server. As discussed above, network data 504 may include data that indicates a quality of one or more application minutes. Machine learning engine 509 may execute machine learning model 510 based on network data 504 in order to generate an output indicating whether each application minute of the one or more application minutes is high-quality (e.g., good) or low-quality (e.g., bad).

In some examples, each application of one or more applications may have a different level of tolerance to each FPM metric. For example, an application may correspond to a threshold latency value, a threshold jitter value, and a threshold loss value. If one or more of the latency value, the jitter value, and the loss value corresponding to an application minute exceed the respective threshold latency value, threshold jitter value, and threshold loss value, the user may experience poor service. Machine learning engine 509 may execute machine learning model 510 in order to determine whether one or more application minutes are high-quality or low-quality based on the network data 504 including latency, jitter, and loss data.

When machine learning engine 509 executes machine learning model 510 to generate an output classifying each application minute of one or more application minutes as being high-quality or low-quality, machine learning system 508 may send the output to application SLE engine 512. Application SLE engine 512 may receive the output from machine learning system 508. In some examples, application SLE engine 512 may additionally or alternatively receive data from pipeline 506 including network data 504 corresponding to one or more application minutes. Application SLE engine 512 may generate, based on the output from machine learning system 508 and/or data received from pipeline 506, an output that further classifies each application minute that is determined to be low-quality (e.g., bad).

Application SLE engine 512 may classify each application minute that is determined to be low-quality (e.g., bad) as being related to one or more problem classifiers of a set of problem classifiers. In some examples, the set of problem classifiers may include a slow application problem classifier corresponding to slow response time from an application server, a TCP retransmission problem classifier corresponding to one or more retries from a client device or the application server caused by service unavailability, an application bandwidth problem classifier corresponding to bandwidth being lower than a threshold amount of bandwidth required by an application corresponding to the respective application time period, and an application disconnect problem classifier corresponding to frequent disconnections from the client device or the application server.

In some examples, slow response time, frequency of retransmission, amount of bandwidth, and application disconnections may be part of network data 504 received by application SLE engine 512. In some examples, application SLE engine 512 may determine any one or combination of slow response time, frequency of retransmission, amount of bandwidth, and application disconnections based on FPM metrics of network data 504 such as latency, jitter, and loss. In any case, application SLE engine 512 may further classify each low-quality (e.g., bad) application minute with one or more problem classifiers of a set of problem classifiers. In some examples, classifiers 514 include the problem classification of each low-quality (e.g., bad) application minute.

System 500 may determine both an initial classification of whether each application minute of one or more application minutes is good or bad, and determine a further problem classification of each bad application minute. That is, system 500 may identify bad application minutes and provide an indication a cause for the low-quality application service. This means that system 500 may provide a network administrator with information as to what is causing users to experience poor application service from one or more applications.

Some applications may receive user feedback. A VoIP application (e.g., Microsoft Teams, Zoom) may, in some cases, output a prompt for user feedback concerning the quality of service experienced with a user. For example, an application my output a request for a user to rate a video call from one to five stars. In some examples, an application my output a request for a user to describe one or more problems with service. In some examples, an application my output a list of possible problems, and ask the user to select problems from the list that the user experienced during use of the application. Machine learning system 508 may, in some examples, receive user feedback data corresponding to one or more applications and generate an output based on the user feedback data.

Application servers 522 may, in some cases, provide service to one or more user devices. In some examples, application servers 522 may be an example of source device 112A and/or destination device 114 of FIG. 1A. In some examples, application servers 522 may be an example of multicloud applications 181 of FIG. 1B, and may provide service to one or more user devices 171 via SD-WAN 177.

User data 524 may represent user feedback corresponding to one or more applications. User data 524 may include user feedback indicating a quality of a user experience in using an application. For example, user data 524 may include user feedback concerning one or more calls made over a VoIP application, or another kind of application that requests user feedback. Application information extractor 526 may receive user data 524 from application servers 522 and forward user data 524 to database 528. In some examples, machine learning engine 509 may be configured to execute machine learning model 510 to generate an output based on data received from database 528, including user data 524. That is, machine learning engine 509 may be configured to execute machine learning model 510 in order to determine whether each application minute of one or more application minutes is high-quality (e.g., "good") or low-quality (e.g., "bad"). In some examples, machine learning system 508 may classify each application minute of one or more application minutes based on data from databases 528 and database 507. That is, machine learning system 508 may analyze the user data 524 in database 528 in addition to analyzing the network data 504 in database 507 to classify each application minute of the one or more application minutes.

It is not required for machine learning system 508 to analyze user data 524 stored in database 528 to classify an application minute as being high-quality or low-quality. In some examples, user data 524 may represent supplemental data that machine learning system 508 analyzes in addition to network data 504 stored in database 507. For example, there may be both user data 524 and network data 504 corresponding to the same one or more application minutes, and machine learning system 508 may analyze both user data 524 and network data 504 to classify the one or more application minutes. In some examples, machine learning system 508 may analyze network data 504 to classify one or more application minutes without analyzing any user data. In some examples, machine learning system 508 may analyze user data 524 to classify one or more application minutes without analyzing any network data.

In some examples, application servers 522 may host one or more different kinds of applications including VoIP applications or collaboration SaaS applications (e.g., Zoom, Microsoft Teams, Webex) data center applications, productivity SaaS applications (e.g., Google Workspace), video streaming applications (e.g., YouTube), or any combination thereof. In some examples, different kinds of applications may be configured to tolerate different amounts of network latency, jitter, and loss. The following table indicates one or more maximum network performance parameter values corresponding to different applications.

TABLE 2

| 128 service category | max latency (ms) | max jitter (ms) | max loss (%) | Max Percentage of retransmission | Max time to first packet Ms | Bandwidth Mbps | Application |
|---|---|---|---|---|---|---|---|
| VoIP-video | 500 | 200 | 30 | N/A | N/A | N/A | Zoom |
| VoIP-video | 500 | 200 | 40 | N/A | N/A | N/A | Microsoft Teams |
| video-streaming-scavenger | 200 | 200 | 5 | 15 | 300 | 0.9 | Youtube, Netflix, Amazon Prime Video |

In some examples, latency values, jitter values, and/or loss values may indicate a poor connection between the client device and the application server. In some examples, one or more disconnections or timeouts may be indicated by latency values, jitter values, and/or loss values. In some examples, a slow load time may be indicated by latency values, jitter values, and/or loss values.

In some examples, system 500 may evaluate one or more application minutes based on a type of the application associated with the one or more application minutes. For example, system 500 may analyze an application minute corresponding to a video streaming application based on a level of bandwidth corresponding to the application minute, a latency or round trip time (RTT) corresponding to the application minute, and a packet loss corresponding to the application minute. In some examples, system 500 may analyze an application minute corresponding to a web browsing application based on a level of bandwidth corresponding to the application minute, a latency or RTT corresponding to the application minute, and a packet loss corresponding to the application minute. In some examples, system 500 may analyze an application minute corresponding to an interactive application based on a level of bandwidth corresponding to the application minute, a latency or RTT corresponding to the application minute, and a packet loss corresponding to the application minute.

System 500 may, in some cases, evaluate one or more application minutes based on a data path route of the application associated with the one or more application minutes. In some examples, system 500 may analyze an application minute corresponding to a client to gateway data path route based on a level of bandwidth corresponding to the application minute, a latency or RTT corresponding to the application minute, and a packet loss corresponding to the application minute. In some examples, system 500 may analyze an application minute corresponding to a data path route between gateway routers based on a level of bandwidth corresponding to the application minute, a latency or RTT corresponding to the application minute, and a packet loss corresponding to the application minute. In some examples, system 500 may analyze an application minute corresponding to a gateway router to application server data path route based on a level of bandwidth corresponding to the application minute, a latency or RTT corresponding to the application minute, and a packet loss corresponding to the application minute.

Every application may have a different level of tolerance to each the above-mentioned application-related problem classifier of a set of application-related problem classifiers. For example, a set of application-related problem classifiers may include a slow application problem classifier, a TCP retransmission problem classifier, an application bandwidth problem classifier, and an application disconnect problem classifier. One application may, in some examples, have a greater tolerance to low bandwidth as compared with another application.

Machine learning model 510 may analyze application minutes based on rich network information e.g., latency, jitter, loss, low-level transport layer metrics, link metrics, and labelled data extracted from the application server on true user experience. The machine learning model 510 may, in some examples, predict a real-time application experience marking an application minute as good or bad and classifying into a different classifier.

In some examples, application health SLE (e.g., application SLE engine 512 and/or machine learning system 508) may measure a real-time user experience corresponding to one or more applications. Application health SLE may be different than WAN link SLE. A low-quality network connection may cause some kinds of applications to perform poorly without impacting one or more other kinds of applications. For example, non-real-time applications such as YouTube or FTP may perform well even when a network connection is low-quality, but real-time applications such as VoIP applications and WebRTC applications may perform poorly when a network connection is low-quality.

Application health SLE (e.g., application SLE engine 512 and/or machine learning system 508) may co-relate one or more FPM (e.g., latency, jitter, loss) metrics with one or more session flow records. Application health SLE may mark a flow to be good or bad based on in-band peer path stats (e.g., FPM stats) and parameters from TCP statistics. That is, application health SLE may determine a performance of an application per device, per site, or at the organization level.

Application health SLE may use session statistics from network devices in order to classify one or more application minutes. For example, application name, service name, and path are examples of session statistics. Application health SLE may also use advanced metrics such as TCP retransmission and TCP first time to data packets, etc. FPM Stats. Application health SLE may use FPM statistics to calculate latency, jitter, loss between two or more network nodes. FPM metrics may be determined using in-band metadata attached to a sample of packets passing between nodes.

In some examples, applications may have different tolerance limits for delay, jitter, and loss. High latency may cause real-time streaming applications to perform poorly, whereas jitter may cause non-real time streaming applications (e.g., YouTube) to perform poorly. Tolerance limits may differ from application to application within the same category of real-time streaming. In some examples, a system may classify packet flows as good, fair, or bad using a threshold-based method.

In some examples, one or more session smart routers may provide the FPM data including latency, jitter, and loss. For examples, each of network devices 110 may be configured to send FPM data to NMS 130. In some examples, NMS 130 may be configured to store FPM data in database 135. In some examples, network devices may provide session records for one or more services. In some examples, NMS 130 may receive session data for all flows. This configuration can be made default or enabled as part of the onboarding process. Filtering logic based on configuration may be supported. NMS 130 may receive application summary data. Application summary data may be tracked using a TCP re-transmission count present in the session stats. A total number of packets transferred may be used to calculate a percentage of re-transmission in a given period.

In some examples, peer path metrics and session flow records may indicate gateway to gateway flows and gateway to application flows. For example, a gateway to gateway flow may extend from router 187A to router 187B, and a gateway to application flow may extend from router 187B to multi-cloud applications 181. In a first phase, an application SLE may depend on the peer path metrics and session flow records. In a second phase, a co-relation of wireless SLE data in the application SLE may be present. In the second phase, application SLE may use application summary data instead of session records for co-relation. In a third phase, application health SLE may add machine learning to a 'flow marking function'.

Figure 6:
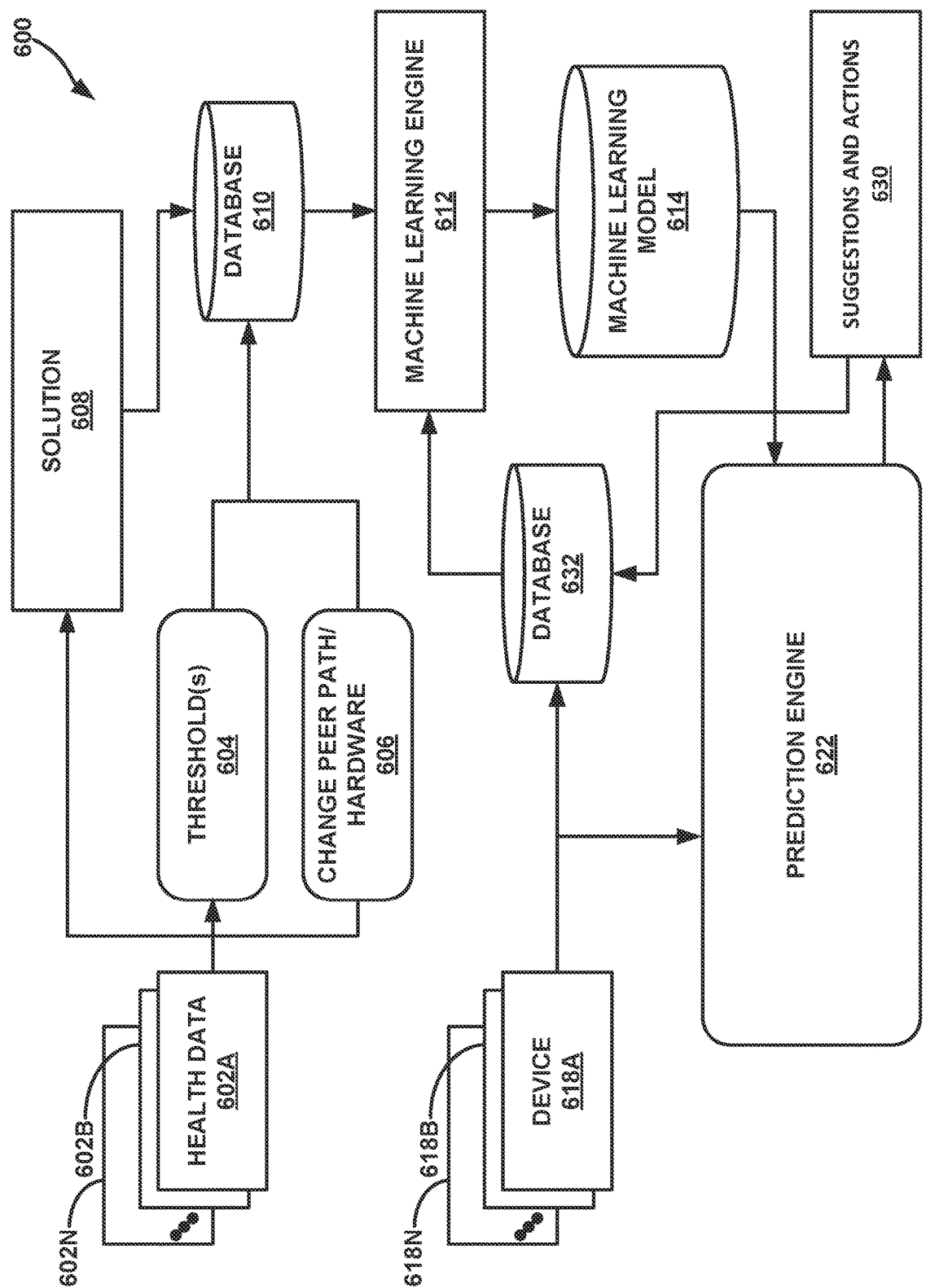
FIG. 6 is a block diagram illustrating a system for providing one or more suggestions and actions based on network health, in accordance with one or more techniques of this disclosure.

FIG. 6 is a block diagram illustrating a system 600 for providing one or more suggestions and actions based on network health, in accordance with one or more techniques of this disclosure. As seen in FIG. 6, system 600 may include health data 602A-602N (collectively, "health data 602"). System 600 may apply one or more thresholds 604 to health data 602 and output health data 502 to database 610. In some examples, system 600 may change peer path or hardware 606 based on applying one or more thresholds 604 to health data 602. System 600 may suggest a solution 608 to one or more issues indicated by health data 602 and output the solution 608 to database 610.

System 600 may use machine learning engine 612 to execute a machine learning model 614 in order to generate an output. In some examples, the output from machine learning model 614 is received by prediction engine 622. Devices 618A-618N may output device data to prediction engine 622 and database 632. Prediction engine 622 may generate, based on the output from machine learning model 614 and the device data, one or more suggestions and actions 630 and output the one or more suggestions or actions to database 632.

System 600 may, in some examples, include an analyze phase, a predict phase, and a suggestions/action phase. System 600 may examine historical patterns in application health SLE, gateway health SLE, and WAN link SLE to come up with proactive suggestions to the configurations. In some examples, application health SLE, gateway health SLE, and WAN link SLE may be included in health data 602.

In some examples, system 600 is configured to identify pattern data from the historical application performance data, historical path data, and historical network device data that is indicative of one or more previous network issues. In some examples, the historical application performance data, the historical path data, and the historical network device data is part of health data 602 of system 600. In some examples, to identify the pattern data that is indicative of one or more previous network issues, system 600 may apply one or more thresholds 604. In some examples, to identify the pattern data that is indicative of one or more previous network issues, system 600 may change peer path or hardware 606, and/or output one or more solutions 608. In some examples, historical application performance data of one or more applications comprises one or more application health assessments associated with one or more application time periods for the network site.

Prediction engine 622 of system 600 may predict, based on the identified pattern data and the current application performance data, the current path data, and the current network device data associated with a network site, one or more potential network issues. In some examples, prediction engine 622 may receive an output from machine learning model 614 and receive data from one or more devices 618.

System 600 may generate one or more suggestions and actions 630 based on the output from prediction engine 622. For example, system 600 may determine at least one configuration change for one or more network devices (e.g., network devices 110) of the network site to remediate the potential network issues. In some examples, system 600 may output a notification of the at least one configuration change to one or more network devices. In some examples, the at least one configuration change for the one or more network devices comprises a service level agreement (SLA)-based routing threshold configuration. In some examples, the at least one configuration change for the one or more network devices comprises a packet path configuration change. In some examples, the notification includes a recommendation to update configurations of the one or more network devices of the network site in accordance with the at least one configuration change. In some examples, NMS 300 is configured to automatically update configurations of the one or more network devices of the network site in accordance with the at least one configuration change. In some examples, to output the notification of the at least one configuration change, system 600 is configured to output the notification via a user interface for display on a user interface device of an administrator associated with the network site.

In some examples, an NMS (e.g., NMS 130) is configured to generate a machine learning model 614 based on pattern data associated with a particular application deployed at the network site. In some examples, machine learning engine 612 may execute machine learning model 614 in order to predict the potential network issues for the particular application deployed at the network site using the machine learning model. In some examples, machine leaning model 614 is different than machine learning model 510 of FIG. 5. Machine learning model 614 may, in some examples, machine learning model 614 comprises a self-learning model. System 600 is configured to provide a continuous feedback mechanism of the determined at least one configuration change and subsequently collected application performance data, path data, and network device data.

Figure 7:
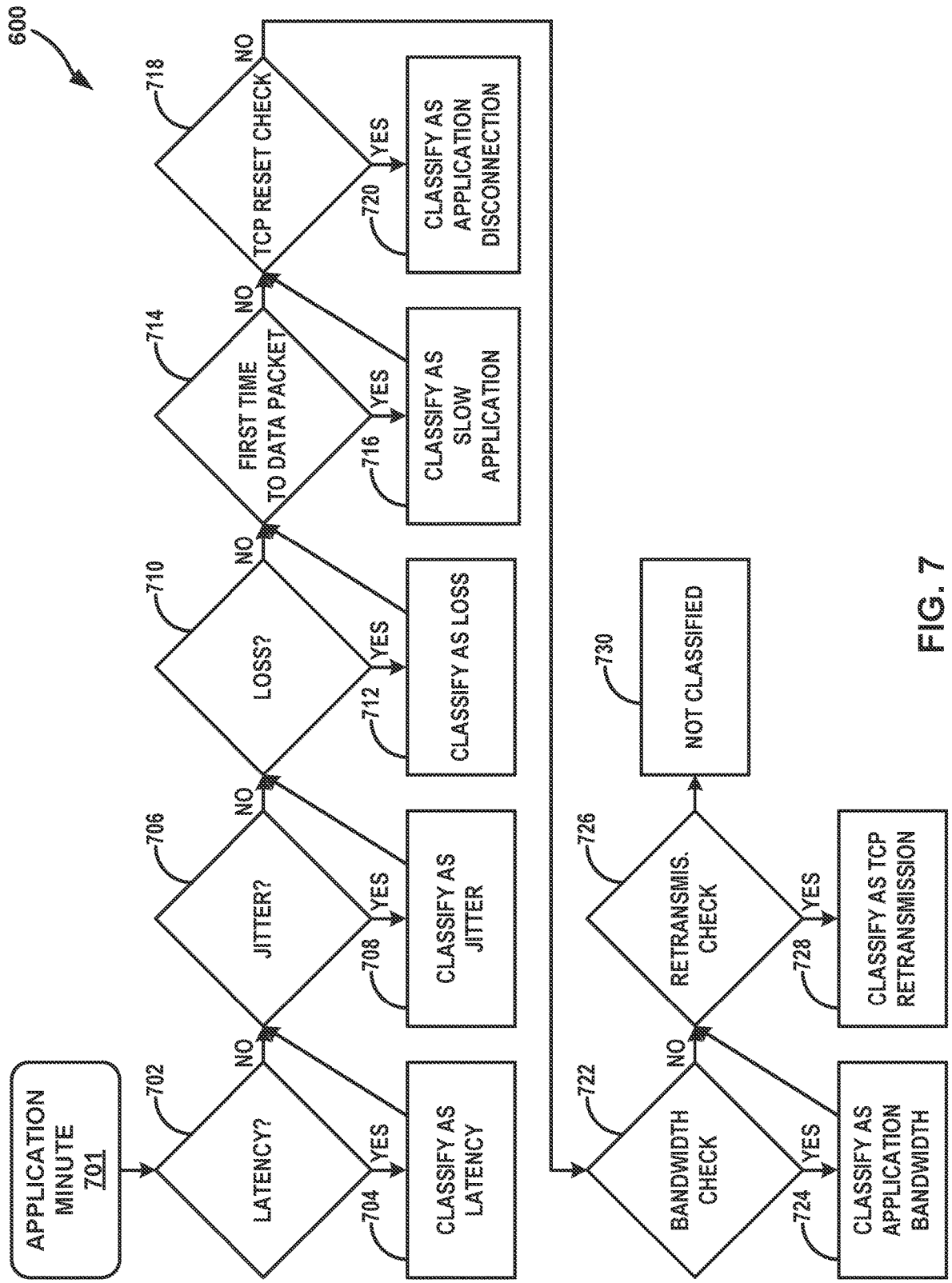
FIG. 7 is a flow diagram illustrating an example operation for classifying one or more application minutes, in accordance with one or more techniques of this disclosure.

FIG. 7 is a flow diagram illustrating an example operation for classifying one or more application minutes, in accordance with one or more techniques of this disclosure. The example operation is described with respect to NMS 130 of FIGS. 1A-1D, and components thereof. However, the techniques of FIG. 7 may be performed by different components of NMS 130, or by additional or alternative network systems.

NMS 130 may determine whether a latency value of application minute 701 is greater than a latency threshold (702). If the latency value of application minute 701 is greater than a latency threshold ("YES" at block 702), NMS 130 may classify the application minute 701 as being high-latency (704). If the latency value of application minute 701 is not greater than a latency threshold ("NO" at block 702), NMS 130 may proceed to block 706.

NMS 130 may determine whether a jitter value of application minute 701 is greater than a jitter threshold (706). If the jitter value of application minute 701 is greater than a jitter threshold ("YES" at block 706), NMS 130 may classify the application minute 701 as being high-jitter (708). If the jitter value of application minute 701 is not greater than a jitter threshold ("NO" at block 706), NMS 130 may proceed to block 710.

NMS 130 may determine whether a loss value of application minute 701 is greater than a loss threshold (710). If the loss value of application minute 701 is greater than a loss threshold ("YES" at block 710), NMS 130 may classify the application minute 701 as being high-loss (712). If the loss value of application minute 701 is not greater than a loss threshold ("NO" at block 710), NMS 130 may proceed to block 714.

NMS 130 may determine whether a first time to data packet value of application minute 701 is greater than a first time to data packet threshold (714). If the first time to data packet value of application minute 701 is greater than a first time to data packet threshold ("YES" at block 714), NMS 130 may classify the application minute 701 as being a slow application (716). If the first time to data packet value of application minute 701 is not greater than a first time to data packet threshold ("NO" at block 714), NMS 130 may proceed to block 718.

NMS 130 may determine whether a TCP reset check value of application minute 701 is greater than a TCP reset check packet threshold (718). If the TCP reset check value of application minute 701 is greater than a TCP reset check threshold ("YES" at block 718), NMS 130 may classify the application minute 701 as being a slow application (720). If the TCP reset check value of application minute 701 is not greater than a TCP reset check threshold ("NO" at block 718), NMS 130 may proceed to block 722.

NMS 130 may determine whether a bandwidth value of application minute 701 is less than a bandwidth threshold (722). If the bandwidth value of application minute 701 is less than a bandwidth threshold ("YES" at block 722), NMS 130 may classify the application minute 701 as being low-bandwidth (724). If the bandwidth value of application minute 701 is not less than a bandwidth threshold ("NO" at block 722), NMS 130 may proceed to block 726.

NMS 130 may determine whether a retransmission value of application minute 701 is greater than a retransmission threshold (726). If the retransmission value of application minute 701 is greater than a retransmission threshold ("YES" at block 726), NMS 130 may classify the application minute 701 as being high-retransmission (728). If the retransmission value of application minute 701 is not greater than a retransmission threshold ("NO" at block 726), NMS 130 may proceed without classifying the application minute 701 (730).

Figure 8:
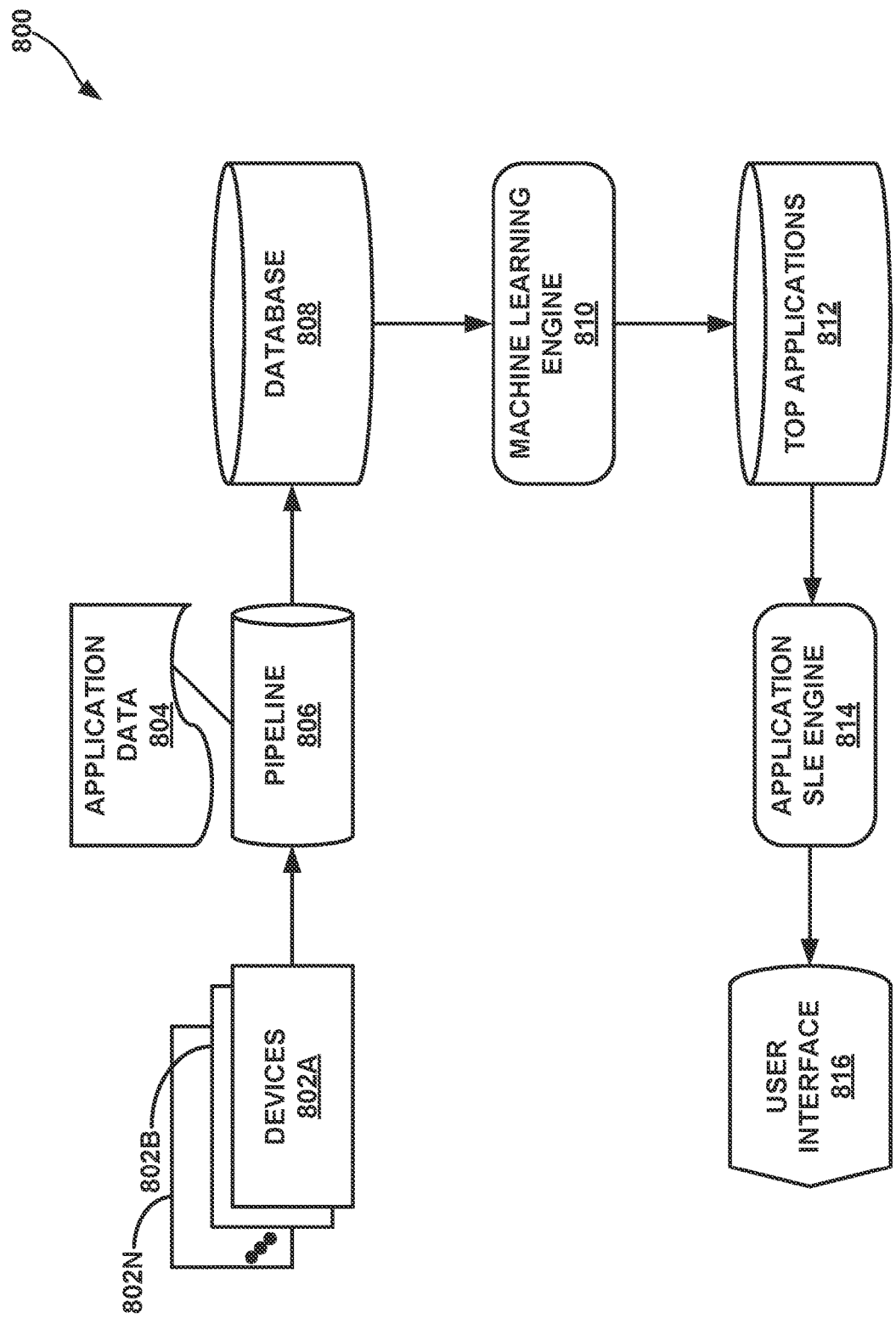
FIG. 8 is a block diagram illustrating a system for determining top applications, in accordance with one or more techniques of this disclosure.

FIG. 8 is a block diagram illustrating a system 800 for determining top applications, in accordance with one or more techniques of this disclosure. As seen in FIG. 8, system 800 includes devices 802A-802N (collectively, "devices 802"), application data 804, pipeline 806, database 808, machine learning engine 810, top applications, 812, application SLE engine 814, and user interface 816.

In some examples, it may be beneficial to identify the top applications on which the application SLE is calculated to improve user experience of those applications. Industry top applications may, in some examples, be identified by one parameter (e.g., number of users, amount of bandwidth used). In some examples, it may be beneficial to consider various factors to obtain a top applications list.

In some examples, system 800 may identify top applications based on one or more parameter such as, duration of usage, a number of times the application is used, number of unique clients in the network using the application, a spread of the usage of an application (e.g., throughout the day, only during lunch time, only at night), and an amount of bandwidth consumed. In some examples, system 800 may assign a weight to each of the parameters and determine an application index or application score based on use of the application. Application index may be a number between 0 and 1.0. An application index of 0 indicates a very low priority app, and an application index of 1 high indicates very high priority application.

In some examples, it may be beneficial to automate a process of identification of the applications which the users care about on a per site basis. A "site" may include of a set of devices 802, including one or more client devices, routers, switches, APs. A set of applications will then be fed into an application SLE engine 814 to come up with machine learning models to calculate the application SLE. The below equations represent an example of an application index calculated based on one or more parameters.

$$\text{Duration of Usage} = \frac{120 \text{ minutes used}}{720 \text{ minutes in 12 hour window}} = 0.16 \text{ (12 hrs)} \quad \text{eq. 1}$$

$$\text{Number of times Application is Used} = \frac{5 \text{ times used}}{12 \text{ total application uses}} = 0.41 \quad \text{eq. 2}$$

$$\text{Number of Unique Clients} = \frac{5 \text{ unique clients}}{12 \text{ total unique clients}} = 0.41 \quad \text{eq. 3}$$

$$\text{Spread of Usage} = \frac{2}{4} = 0.5 \text{ (morning, noon, evening and night)} \quad \text{eq. 4}$$

$$\text{Bandwidth} = \frac{1000 \text{ (application bandwidth)}}{5000 \text{ (total bandwidth across applications)}} = 0.2 \quad \text{eq. 5}$$

$$\text{Application Index} = (0.16+0.41+0.41+0.5+0.2)/5 = 0.69 \quad \text{eq. 6}$$

In some examples, devices 802 may correspond to devices (e.g., network devices) within a WAN over which client device establishes a connection with an application server, and over which the application server provides service to the client device. In some examples, devices 802 may correspond to one or more network devices 110 of FIG. 10. That is, devices 802 may be part of a pathway within a WAN over which source devices 112A communicates with destination device 114. In some examples, source devices 112 of FIG. 1A are client devices and destination device 114 represents an application server. In some examples, source devices 112 of FIG. 1A represent application servers and destination device 114 may represent a client device. In some examples, devices 802 may correspond to routers 187 of FIGS. 1B-1D and/or any other devices within SD-WAN 177.

In some examples, application data 804 includes data corresponding to one or more applications such as duration of usage, number of times an application is used, a number of unique clients of the application, a spread of usage of the application, an amount of bandwidth used by the application, and an application index of the application. In some examples, application data 804 includes separate application data for each application of the one or more applications.

Pipeline 806 may deliver data to one or more engines for processing. For example, pipeline 806 may deliver network data 804 and/or other data to database 808. In some examples, database 808 may be stored in NMS 130. In some examples, database 808 is stored within database 135 of NMS 130. In some examples, database 808 is stored within NMS 130 separately from database 135. Pipeline 806 may represent any sort of connection (e.g., wired or wireless) that is configured to deliver data to database 808 or any other device.

NMS 130 may, in some examples, use machine learning engine 810 to execute one or more machine models. For example, NMS 130 may use machine learning engine 810 to execute a machine learning model to identify one or more top applications 812 based on application data 804 stored in database 808. Application SLE engine 814 may output one or more top applications 812 to a user interface 816.

In some examples, system 800 may learn one or more top applications based on a frequency of sessions for a service, a length of a session, and a number of bytes transferred for a service or application. However it may not represent the set of services which would be interesting to the customer. Session flow records may have a session identification service name field which can be used to identify the configured services. Use only the configured services learnt from the session flow records. System 800 (e.g., machine learning engine 810) may learn top applications based on one or more criteria and filter results based on top applications. System 800 may provide a recommended list of applications to a user.

Figure 9:
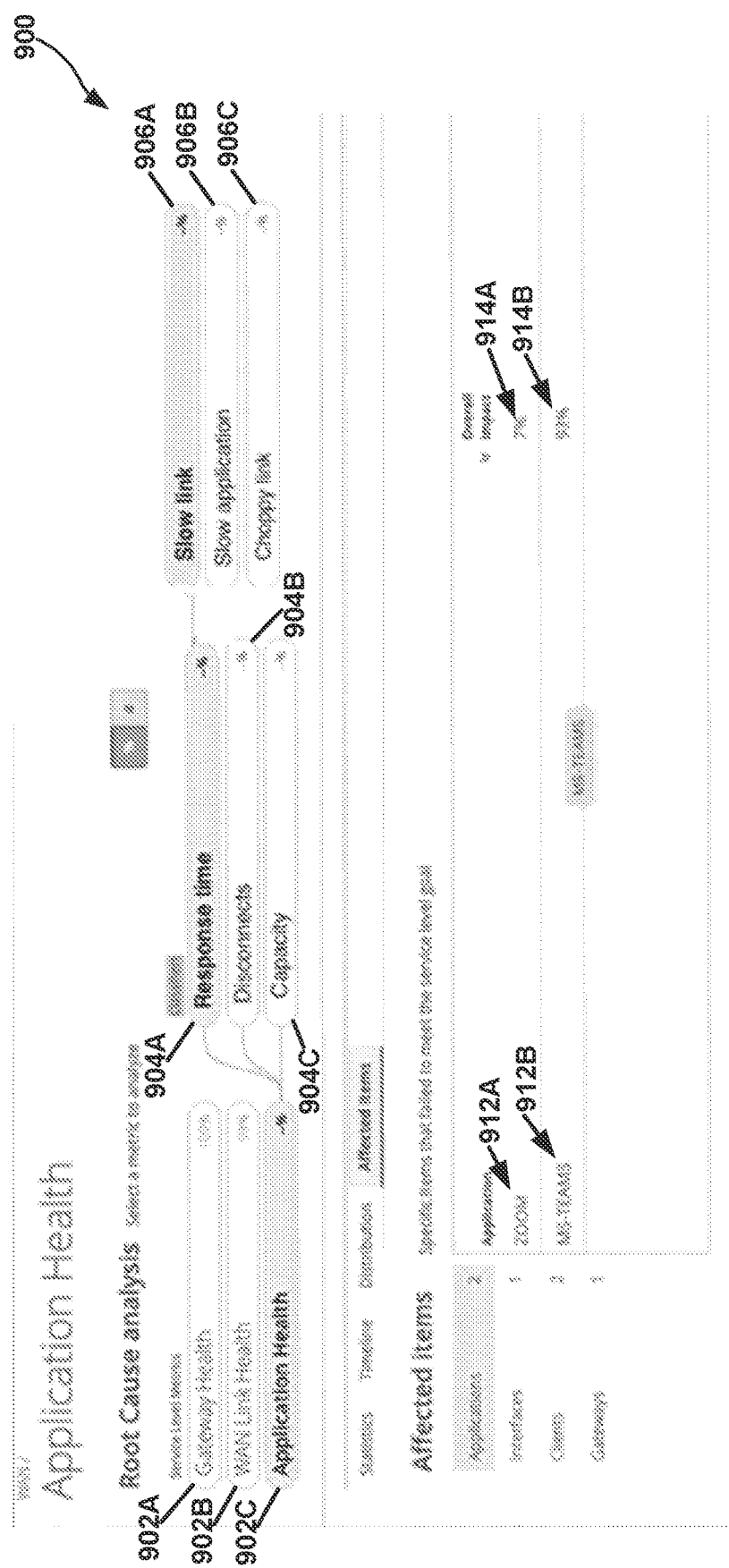
FIG. 9 is a conceptual diagram illustrating a user interface screen including a first example root cause analysis performed by an NMS, in accordance with one or more techniques of this disclosure.

FIG. 9 is a conceptual diagram illustrating a user interface screen 900 including a first example root cause analysis performed by NMS 300, in accordance with one or more techniques of this disclosure. As seen in FIG. 9, user interface screen 900 includes a gateway health indicator 902A, a WAN link health indicator 902B, and an application health indicator 902C. User interface screen 900 includes a response time classifier 904A, a disconnects classifier 904B, and a capacity classifier 904C corresponding to the application health indicator 902C. User interface screen 900 includes a slow link sub-classifier 906A, a slow application sub-classifier 906B, and a choppy link sub-classifier 906C.

In some examples, user interface screen 900 may indicate one or more applications corresponding to a selected one or more classifiers. For example, the application health indicator 902C, the response time classifier 904A, and the slow link sub-classifier 906A may be selected on user interface screen 900. User interface screen 900 may indicate a first application 912A and a second application 912B. User interface screen 900 may indicate a first overall impact 914A corresponding to the first application 912A and a second overall impact 914B corresponding to the second application 912B.

Figure 10:
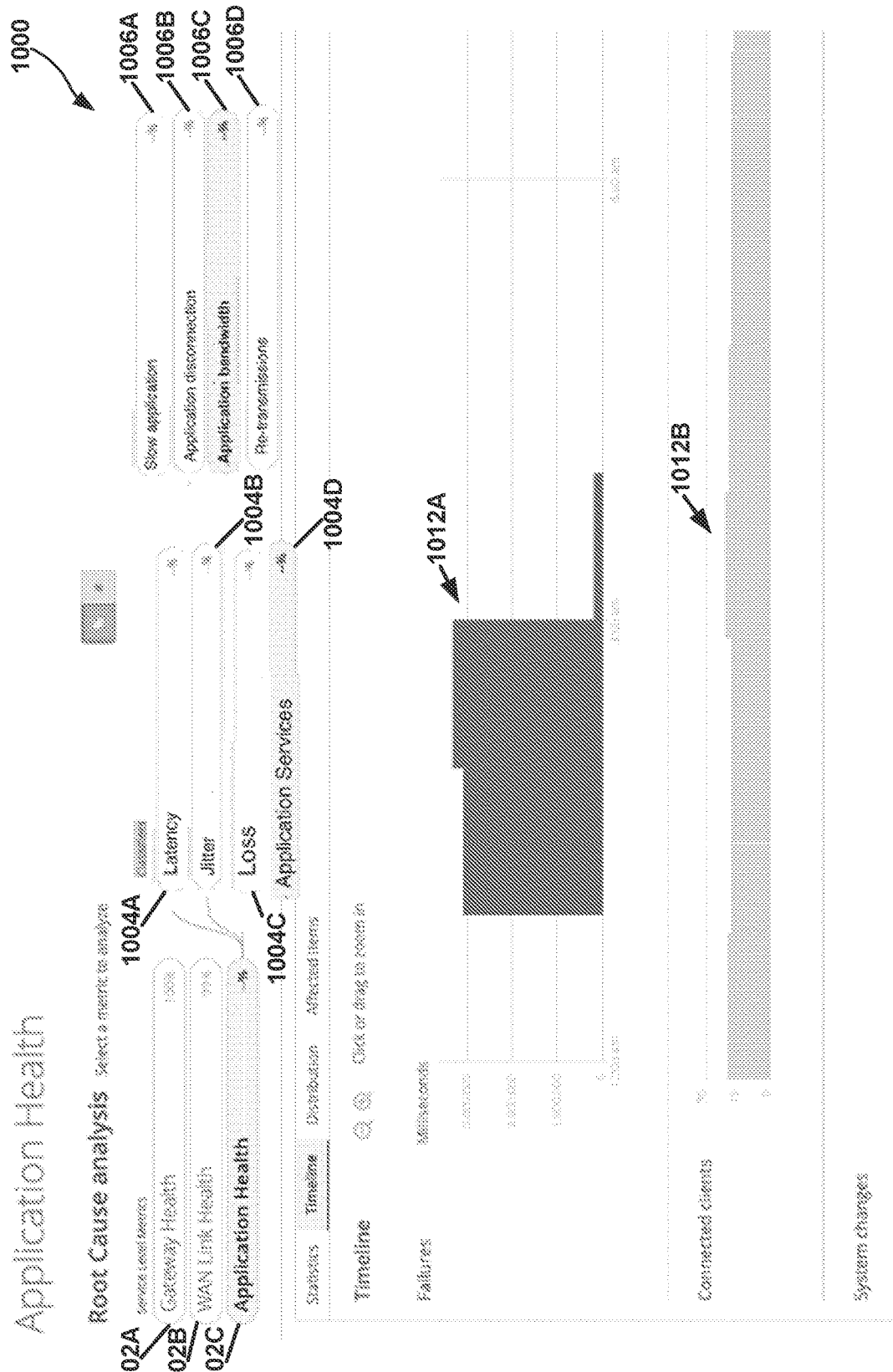
FIG. 10 is a conceptual diagram illustrating a user interface screen including a second example root cause analysis performed by an NMS, in accordance with one or more techniques of this disclosure.

FIG. 10 is a conceptual diagram illustrating a user interface screen 1000 including a second example root cause analysis performed by NMS 300, in accordance with one or more techniques of this disclosure. As seen in FIG. 10, user interface screen 1000 includes a gateway health indicator 1002A, a WAN link health indicator 1002B, and an application health indicator 1002C. User interface screen 1000 includes a latency classifier 1004A, a jitter classifier 1004B, a loss classifier 1004C, and an application services classifier 1004D. User interface screen 1000 includes a slow application classifier 1006A, an application disconnection classifier 1006B, an application bandwidth classifier 1006C, and a retransmissions classifier 1006D corresponding to the application services classifier 1004D. User interface screen 1000 may include a first data type 1012A and a second data type 1012B corresponding to the application health indicator 1002C, the application services classifier 1004D, and the application bandwidth classifier 1006C. In some examples, the first data type 1012A may correspond to a number of failures over a period of time. In some examples, and the second data type 1012B may correspond to a number of connected clients over a period of time.

Figure 11:
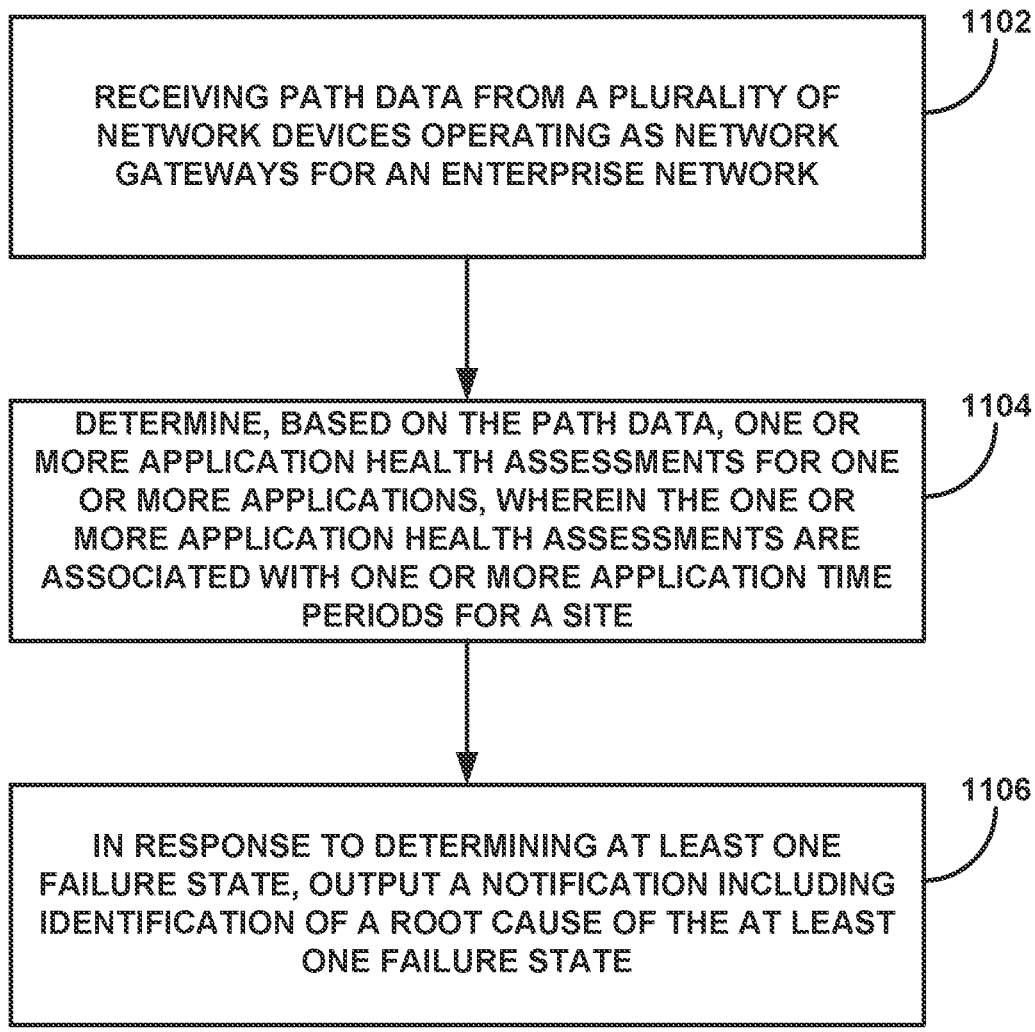
FIG. 11 is a flow diagram illustrating an example operation for one or more application health assessments, in accordance with one or more techniques of this disclosure.

FIG. 11 is a flow diagram illustrating an example operation for performing one or more application health assessments, in accordance with one or more techniques of this disclosure. The example operation is described with respect to NMS 130 of FIGS. 1A-1D and FIG. 3, and components thereof. However, the techniques of FIG. 11 may be performed by different components of NMS 130, or by additional or alternative network systems.

NMS 130 may receive path data from a plurality of network devices operating as network gateways for an enterprise network (1102). In some examples, the network devices may include one or more of network devices 110 of FIG. 1A. In some examples, the network devices may include one or more of routers 187 of FIGS. 1B-1D. In some examples, the network devices may include network device 200 of FIG. 2. NMS 130 may include an application health SLE engine 134 configured to determine, based on the path data, one or more application health assessments for one or more applications, wherein the one or more application health assessments are associated with one or more application time periods for a site (1104). In response to determining at least one failure state, NMS 300 is configured to output a notification including identification of a root cause of at least one failure state (1106).

Figure 12:
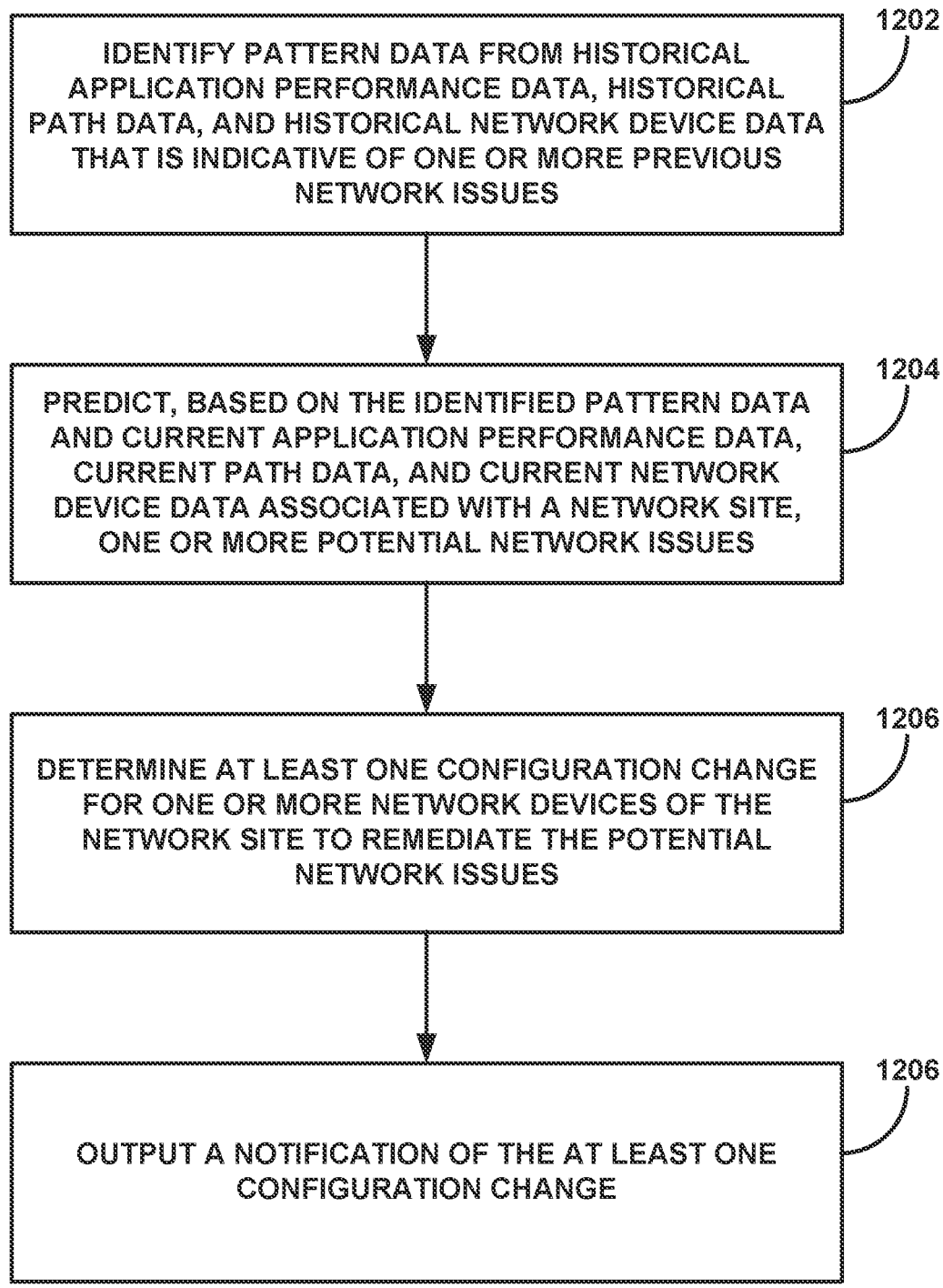
FIG. 12 is a flow diagram illustrating an example operation for predicting network issues and determining configuration changes, in accordance with one or more techniques of this disclosure.

FIG. 12 is a flow diagram illustrating an example operation for predicting network issues and determining configuration changes, in accordance with one or more techniques of this disclosure. The example operation is described with respect to NMS 130 of FIGS. 1A-1D and FIG. 3, and components thereof. However, the techniques of FIG. 11 may be performed by different components of NMS 130, or by additional or alternative network systems.

NMS 130 may identify pattern data from historical application performance data, historical path data, and historical network device data that is indicative of one or more previous network issues (1202). NMS 130 may predict, based on the identified pattern data and current application performance data, current path data, and current network device data associated with a network site, one or more potential network issues (1204). NMS 130 may determine at least one configuration change for one or more network devices of the network site to remediate the potential network issues (1206). NMS 130 may output a notification of the at least one configuration change (1206).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network management system (NMS) of an enterprise network, the NMS comprising:

memory; and
processing circuitry in communication with the memory and configured to:
obtain historical network data associated with a network site of the enterprise network for one or more previous application time periods, wherein the historical network data includes historical application performance data of one or more applications, historical path data for a plurality of logical paths between a plurality of network gateways over a wide area network (WAN), and historical network device data of the plurality of network gateways, wherein the historical path data comprises latency data, jitter data, and loss data for each logical path of the plurality of logical paths for the one or more previous application time periods;
identify pattern data from the historical network data that is indicative of one or more network issues that occurred during the one or more previous application time periods,
generate a machine learning model based on the identified pattern data associated with a particular application deployed at the network site;
obtain current network data associated with the network site of the enterprise network for a current application time period, wherein the current network data includes current application performance data, current path data, and current network device data,
predict, based on the current network data as input to the machine learning model, one or more potential network issues corresponding to one or more logical paths of the plurality of logical paths associated with one or more network gateways of the plurality of network gateways for the particular application during the current application time period,
determine at least one configuration change for the one or more network gateways to remediate the one or more potential network issues corresponding to the one or more logical paths associated with the one or more network gateways for the particular application, and
send a notification of the at least one configuration change including instructions to update configurations of the one or more network gateways in accordance with the at least one configuration change.

2. The NMS of claim 1, wherein the machine learning model comprises a self-learning model, and wherein the processing circuitry is configured to provide a continuous feedback mechanism of the determined at least one configuration change and subsequent network data associated with the network site of the enterprise network for a subsequent application time period after the at least one configuration change to the one or more network gateways.

3. The NMS of claim 2, wherein the processing circuitry is configured to:
obtain the subsequent network data associated with the network site of the enterprise network for the subsequent application time period, wherein the subsequent network data includes subsequent application performance data, subsequent path data, and subsequent network device data; and
update the machine learning model based on the at least one configuration change and the subsequent network data associated with the network site of the enterprise network for the subsequent application time period.

4. The NMS of claim 1, wherein the at least one configuration change for the one or more network gateways comprises a service level agreement (SLA)-based routing threshold configuration.

5. The NMS of claim 1, wherein the at least one configuration change for the one or more network gateways comprises a packet path configuration change.

6. The NMS of claim 1, wherein the historical application performance data of the one or more applications comprises one or more application health assessments associated with the one or more previous application time periods.

7. The NMS of claim 1, wherein the notification includes a recommendation to update the configurations of the one or more network gateways in accordance with the at least one configuration change for approval by an administrator associated with the network site prior to updating the configurations of the one or more network gateways.

8. The NMS of claim 1, wherein to send the notification of the at least one configuration change, the processing circuitry is configured to send the notification to the one or more network gateways thereby instructing the one or more network gateways to automatically update the configurations of the one or more network gateways in accordance with the at least one configuration change.

9. The NMS of claim 1, wherein to send the notification of the at least one configuration change, the processing circuitry is configured to send data representative of a user interface that includes the notification for display on a user interface device of an administrator associated with the network site.

10. A method comprising:
obtaining, by processing circuitry of a network management system (NMS) of an enterprise network, historical network data associated with a network site of the enterprise network for one or more previous application time periods, wherein the historical network data includes historical application performance data of one or more applications, historical path data for a plurality of logical paths between a plurality of network gateways over a wide area network (WAN), and historical network device data of the plurality of network gateways, wherein the historical path data comprises latency data, jitter data, and loss data for each logical path of the plurality of logical paths for the one or more previous application time periods;
identifying, by the processing circuitry, pattern data from the historical network data that is indicative of one or more network issues that occurred during the one or more previous application time periods;
generating, by the processing circuitry, a machine learning model based on the identified pattern data associated with a particular application deployed at the network site;
obtaining, by the processing circuitry, current network data associated with the network site of the enterprise network for a current application time period, wherein the current network data includes current application performance data, current path data, and current network device data;
predicting, by the processing circuitry based on the current network data as input to the machine learning model, one or more potential network issues corresponding to one or more logical paths of the plurality of logical paths associated with one or more network gateways of the plurality of network gateways for the particular application during the current application time period;

determining, by the processing circuitry, at least one configuration change for the one or more network gateways to remediate the one or more potential network issues corresponding to the one or more logical paths associated with the one or more network gateways for the particular application; and sending, by the processing circuitry, a notification of the at least one configuration change including instructions to update configurations of the one or more network gateways in accordance with the at least one configuration change.

11. The method of claim 10, wherein the machine learning model comprises a self-learning model, and wherein the method further comprises providing, by the processing circuitry, a continuous feedback mechanism of the determined at least one configuration change and subsequent network data associated with the network site of the enterprise network for a subsequent application time period after the at least one configuration change to the one or more network gateways.

12. The method of claim 10, wherein the at least one configuration change for the one or more network gateways comprises a service level agreement (SLA)-based routing threshold configuration.

13. The method of claim 10, wherein the at least one configuration change for the one or more network gateways comprises a packet path configuration change.

14. The method of claim 10, wherein the historical application performance data of the one or more applications comprises one or more application health assessments associated with the one or more previous application time periods.

15. The method of claim 10, wherein the notification includes a recommendation to update the configurations of the one or more network gateways in accordance with the at least one configuration change for approval by an administrator associated with the network site prior to updating the configurations of the one or more network gateways.

16. The method of claim 10, wherein sending the notification of the at least one configuration change comprises sending the notification to the one or more network gateways thereby instructing the one or more network gateways to automatically update the configurations of the one or more network gateways in accordance with the at least one configuration change.

17. The method of claim 10, wherein sending the notification of the at least one configuration change comprises sending, by the processing circuitry, data representative of a user interface that includes the notification for display on a user interface device of an administrator associated with the network site.

18. Non-transitory computer-readable media comprising instructions for causing one or more processors to:

obtain historical network data associated with a network site of an enterprise network for one or more previous application time periods, wherein the historical network data includes historical application performance data of one or more applications, historical path data for a plurality of logical paths between a plurality of network gateways over a wide area network (WAN), and historical network device data of the plurality of network gateways, wherein the historical path data comprises latency data, jitter data, and loss data for each logical path of the plurality of logical paths for the one or more previous application time periods;

identify pattern data from the historical network data that is indicative of one or more network issues that occurred during the one or more previous application time periods;

generate a machine learning model based on the identified pattern data associated with a particular application deployed at the network site;

obtain current network data associated with the network site of the enterprise network for a current application time period, wherein the current network data includes current application performance data, current path data, and current network device data;

predict, based on the current network data as input to the machine learning model, one or more potential network issues corresponding to one or more logical paths of the plurality of logical paths associated with one or more network gateways of the plurality of network gateways for the particular application during the current application time period;

determine at least one configuration change for the one or more network gateways to remediate the one or more potential network issues corresponding to the one or more logical paths associated with the one or more network gateways for the particular application; and send a notification of the at least one configuration change including instructions to update configurations of the one or more network gateways in accordance with the at least one configuration change.

* * * * *